United States Patent [19]

Hayasaki et al.

[11] Patent Number: 4,730,521
[45] Date of Patent: Mar. 15, 1988

[54] CONTROL SYSTEM FOR ALLEVIATING SHOCK IN AUTOMATIC TRANSMISSION

[75] Inventors: Koichi Hayasaki, Fujisawa; Kazuhiko Sugano, Yokohama, both of Japan

[73] Assignee: Nissan Motor Co., Ltd., Yokohama, Japan

[21] Appl. No.: 905,268

[22] Filed: Sep. 9, 1986

[30] Foreign Application Priority Data

Sep. 11, 1985 [JP] Japan .................................. 60-199316

[51] Int. Cl.⁴ .............................................. B60K 41/16
[52] U.S. Cl. .......................................... 74/867; 74/868
[58] Field of Search .................................. 74/867, 868

[56] References Cited

U.S. PATENT DOCUMENTS

| | | | |
|---|---|---|---|
| 3,623,382 | 11/1971 | Chana | 74/864 |
| 4,125,038 | 11/1978 | Hiramatsu | 74/869 |
| 4,274,308 | 6/1981 | Iwanaga et al. | 74/869 |
| 4,430,910 | 2/1984 | Lemieux et al. | 74/867 |
| 4,432,255 | 2/1984 | Borman et al. | 74/867 X |
| 4,462,280 | 7/1984 | Sugano et al. | 74/867 X |

*Primary Examiner*—Dirk Wright
*Attorney, Agent, or Firm*—Schwartz, Jeffery, Schwaab, Mack, Blumenthal & Evans

[57] ABSTRACT

An accumulator designed to alleviate a so-called N-D select shock is connected in a hydraulic control system for an automatic transmission such that it can also alleviate a 3-4 shift shock. The accumulator includes a piston and a spring biasing the piston. The spring force of the spring is appropriately set such that the piston starts moving against the spring in response to small pressure build-up of a drive range select pressure.

8 Claims, 8 Drawing Figures

CONTROL SYSTEM FOR ALLEVIATING SHOCK IN AUTOMATIC TRANSMISSION

COPENDING RELATED APPLICATIONS

Reference should be made to the following copending U.S. applications which have been assigned to the assignee of the present application.

U.S. application Ser. No. 885,136, filed July 14, 1986 claiming priority on Japanese Patent Application No. 60-171866 filed on Aug. 6, 1985;

U.S. application Ser. No. 885,135, filed July 14, 1986 claiming priority on Japanese Patent Application No. 60-154244 filed on July 15, 1985;

U.S. application Ser. No. 890,371, filed July 29, 1986 claiming priority on Japanese Patent Application No. 60-166646 filed on July 30, 1985;

U.S. application Ser. No. 890,370, filed July 29, 1986 claiming priority on Japanese Patent Application No. 60-166647 filed on July 30, 1985, U.S. application Ser. No. 905,078, filed Sept. 9, 1986 claiming priority on Japanese Patent Applications No. 60-199318 filed on Sept. 11, 1985, and No. 60-199319 filed on Sept. 11, 1985.

U.S. application Ser. No. 893,243, filed Aug. 25, 1986 claiming priority on Japanese Patent Applications No. 60-171154 filed on Aug. 5, 1985, No. 60-171865 filed on Aug. 6, 1985, No. 60-171869 filed on Aug. 6, 1985, and No. 60-197078 filed on Sept. 6, 1985.

BACKGROUND OF THE INVENTION

The present invention relates to a control system for alleviating shocks occurring within an automatic transmission.

In an automatic transmission, when a driver places a manual valve from a neutral (N) range to a forward drive (D) range, a hydraulic pressure is supplied to a forward drive friction element, thus permitting establishment of a torque delivery path for forward running of a vehicle with automatic shift, while when he/she places the manual valve from the N range to a reverse drive (R) range, the hydraulic fluid pressure is supplied to reverse drive friction elements, thus permitting establishment of a torque delivery path for reverse running with a single gear ratio. If, upon shifting the manual valve from the N range to the D range or to the R range, the supply of the hydraulic pressure to the corresponding friction element or elements is too quick, the transmission torque of the friction element or elements rises too rapidly to generate substantially great shock. This shock is hereinafter called as a N-D select shock if it occurs upon placing the manual valve from the N range to the D range and as a N-R select shock if it occurs upon placing the manual valve from the N range to the R range. In the case where a friction element is to be engaged with the above mentioned forward drive friction element kept engaged in order to effect a shift depending on running condition of the vehicle, if the supply of hydraulic fluid pressure to the friction element to be engaged is rapid, a great shift shock occurs due mainly to rotational inertia of the engine.

In order to deal with this problem, it has been proposed in U.S. Pat. No. 4,274,308 to use a common accumulator to suppress the above mentioned two kinds of select shock as well as shift shock. This known accumulator is explained along with FIG. 5. It has a stepped piston a biased by a spring b upwards as viewed in FIG. 5. The stepped piston a defines between two different diameter piston ends an intermediate chamber c for receiving a back-up pressure related to the engine load (or engine torque or throttle opening degree). In this known example, a forward drive select pressure, i.e., a line pressure variable in proportion to the engine load and kept supplied to a forward drive friction element during forward drive. It defines a first end chamber d which the smaller diameter piston end is exposed to and a second end chamber e which the larger diameter piston end is exposed to. The first end chamber d receives a reverse drive select pressure, while the second end chamber e receives a second speed ratio pressure.

The operation of the accumulator is hereinafter explained.

When the manual valve is placed at the N range, the stepped piston a assumes the illustrated postion under the bias of the spring b since none of the three chambers c, d and e are pressurized. If the manual valve is shited to the R range, the reverse drive select pressure appears and is supplied to the chamber d in such a manner as to push the piston a against the action of the spring b so that the pressure builds up gradually in accordance with characteritic determined by the spring force of the spring b. This contributes to alleviation of the N-R select shock. If, on the other hand, the manual valve is shifted to the D range, the forward drive pressure appears and is supplied to the chamber c pushing the piston a against the spring b so as to cause a gradual pressure build-up in accordance with the characteristic determined by the spring force of the spring b, thus contributing to alleviation of the N-D select shock. Lastly, if, with the manual valve kept at the D range, the second pressure appears to effect an upshift to the second speed ratio, this pressure is supplied to the chamber e in such a manner as to push back the piston c upwards assisting the action of the spring b, thus alleviating the shift shock occurring during 1-2 upshift.

In order to alleviate the shift shock to a satisfactorily low level with this known accumulator, the setting of the spring b must be such that the piston c begins to move upwards against the forward drive select pressure applied to the chamber c immediately after the supply of second speed ratio pressure to the chamber e has begun. This movement of the piston a must begin even during operating condition with low throttle opening degree setting as will be readily understood from FIG. 6. In FIG. 6, a fully drawn curve α (alpha) shows the variation in engine specific torque [which is expressed by an equation: (engine output torque)/(the maximum engine output torque)] against the variation in throttle opening degree at 1-2 upshift, while a broken curve β (betha) shows the engine specific torque vs. throttle opening degree at 3-4 upshift.

Besides, the upward movement of the piston a must be carried out against the forward drive select pressure variable in proportion to the throttle opening degree. In order to assure this upward movement of the piston a, the spring b which is arranged to assist this movement must have a relatively large spring force.

Since, for the preceding rason, the spring force is large, the N-R select shock or N-D select shock cannot be alleviated until the pressure builds up to a level high enough to push the piston a downwards overcoming the spring force of the spring b. This shick alleviating characteristic is not satisfactory because the select shock is not suppressed to sufficiently low level.

An object of the present invention is to provide a control system wherein an accumulator is operatively disposed therein in order to alleviate not only shift shock, but also select shock to satisfactorily low levels, respectively.

SUMMARY OF THE INVENTION

According to the present invention, there is provided a control system for an automatic transmission which is shiftable to a plurality of speed ratios including a predetermined speed ratio other than a first speed ratio and a second speed ratio. The control system comprises an accumulator including a piston defining three chambers which are selectively expandable in volume in response to movement of the piston, and resilient means acting on said piston in assisting movement of said piston in one of two directions and in yieldably resisting movement of said piston in the other direction which is opposite to said one direction. The control system also comprises means for keeping a first hydraulic fluid pressure applied to first one of said three chambers to act on said piston to urge the same against said resilient means in such a manner as to decrease the volume of second one of said three chambers while a predetermined drive range is selected in the automatic transmission; a friction element to be engaged when the transmission uphifts to the predetermined speed ratio while said predetermined drive range is selected, said friction element communicating with said second chamber; means for applying a second hydraulic pressure to said second chamber to assist the action of said resilient means to cause said piston to move in said one direction so as to expand the volume of said second chamber, allowing gradual build-up in pressure applied to said friction element; a second friction element communicating with third one of said three chamber to be enagaged by pressure build-up therein; and means for applying a third hydraulic fluid pressure to said third one of said three chambers with the other first and second chambers kept depressurized, when a second predetermined drive range is selected in the automatic transmission, to act on said piston to move said piston against the action of said resilient means in said second direction so as to expand the volume of said third chamber, allowing gradual build-up pressure applied to said second friction element.

DETAILED DESCRIPTION OF THE INVENTION

Referring to FIGS. 1A, 1B, 1C, 2, and 3, there is described a preferred embodiment according to the present which incoporates various features which will be described later in connection with FIGS. 4 to 9.

Figure 2:
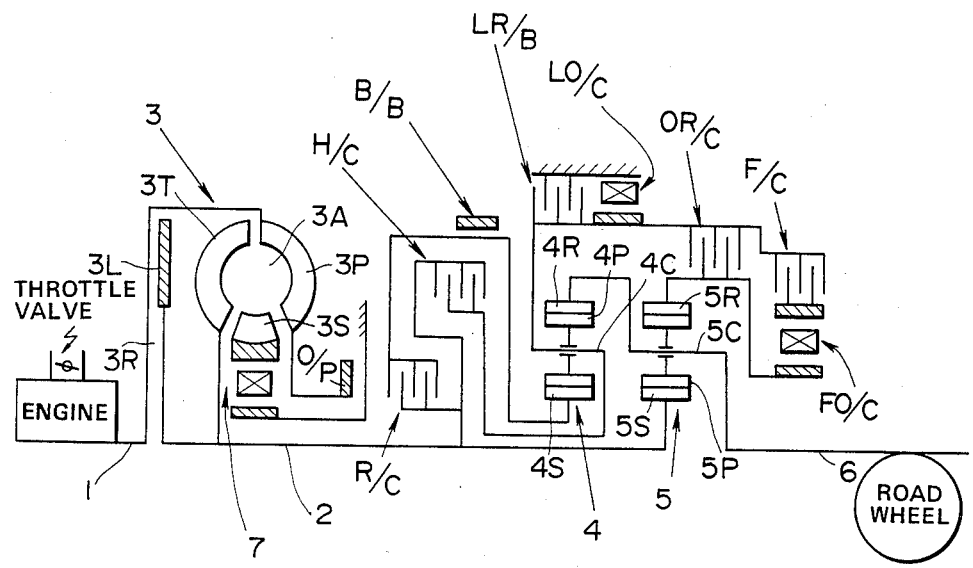
FIG. 2 is a schematic view showing the power train of the automatic transmission with an engine and a road wheel of the automotive vehicle.

Referring to FIG. 2, the power train is shown as being connected to an engine with a throttle valve which opens in degrees and road wheels although only one being diagrammatically shown. The power train is driven by the engine output shaft 1. To transmit engine torque to an input or turbine shaft 2, a torque converter 3 has a pump impeller connected to engine output shaft 1, and a turbine runner 3T connected to input shaft 2. The torque converter 3 also includes a stator 3S. Pump imepeller 3P is connected to an oil pump O/P to drive the same. The power transmission further comprises a first planetary gear set 4, a second planetary gear set 5, and output shaft 6, and a various kinds of frictional elements which will be described later.

Torque converter 3 is of a so-called lock-up torque converter including a lock-up clutch 3L which when engaged, mechanically connects the pump impeller 3P with the turbine runner 3T, thus eliminating slip taking place between them. Lock-up clutch 3L assumes a disengaged position when working fluid is supplied to a release chamber 3R and then discharged from an apply chamber 3A. Lock-up clutch 3L is disengaged when working fluid is supplied to the apply chamber 3A and then discharged from the release chamber 3R.

First planetary gear set 4 is of a simple planetary gear set which comprises a sun gear 4S, a ring gear 4R, pinions 4P meshing with them, and a carrier 4P rotatably carrying the pinions 4P. Second planetary gear set 5 is of a simple planetary gear set which comprises a sun gear 5S, a ring gear 5R, pinions 5P meshing with them, and a carrier 5C rotatably carrying the pinions 5P.

Carrier 4C is connectable with input shaft 2 via a high clutch H/C, and sun gear 4S is connectable with input shaft 2 via a reverse clutch R/C. Sun gear 4S is adpated to be anchored by a band brake B/B. Carrier 4C is adapted to be anchored by a low & reverse brake LR/B and its reverse rotation is prevented by a low one-way clutch LO/C. Ring gear 4R is connected integrally with carrier 5C which is drivingly connected to output shaft 6. Sun gear 5S is connected with input shaft 2. Ring gear 5R is connectable with carrier 4C via an overrun clutch OR/C. To establish a predetermined drive relation, a forward one-way clutch FO/C and a forward clutch F/C are arranged between the carrier 4C and the ring gear 5R. Engagement of the forward clutch F/C causes the forward one-way clutch FO/C to connect the ring gear 5R with the carrier 4C in the reverse rotational direction.

Figure 3:
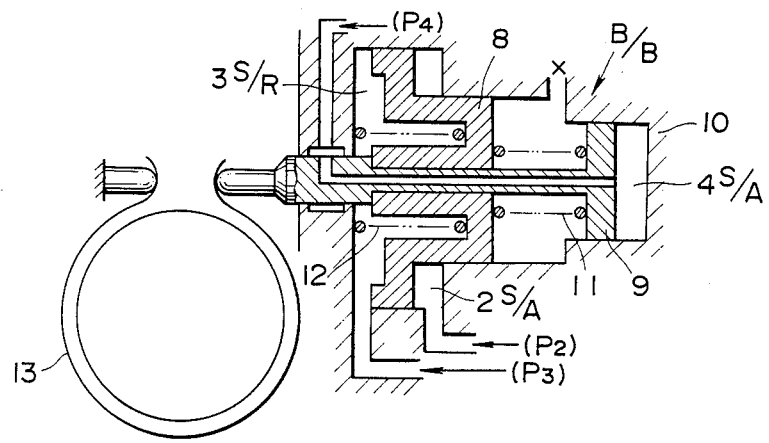
FIG. 3 is a schematic sectional view of a band brake.

High clutch H/C. reverse clutch R/C, low and reverse brake LR/B, overrun clutch OR/C, and forward clutch F/C are activated, i.e., engaged or applied, when supplied with hydraulic pressure. Band brake B/B is constructed as shown in FIG. 3. A housing 10 is formed with a stepped bore including three different diameter bore sections which are connected one after another as shown in FIG. 3. A stepped piston 8 is received in different diameter bore sections having the largest diameter and a diameter smaller than the largest diameter but still larger than the smallest. The stepped piston 8 defines on one side of its larger diameter piston section a second speed servo apply chamber 2S/A and on the opposite side thereof a third speed servo release chamber 3S/R. Received in the bore section having the smallest diameter is a piston 9. The piston 9 defines on one side thereof a fourth speed servo apply chamber 4S/A and on the opposite side thereof where it faces the reduced diameter piston section of the stepped piston 8 a drain chamber. The piston 9 has a plunger slidably extending through the stepped piston 8, the plunger of the piston 9 serving as means for defining a passage adapted to deliver fourth speed pressure P4 to fourth speed servo apply chamber 4S/A. The plunger of piston 9 is enlarged in diameter at the remote end portion from the piston to form a shoulder abutting with that side of the stepped piston 8 exposed to the three speed servo release chamber 3S/R. The plunger is anchored to a brake band 13. Provided within the drain chamber is a spring 11 and provided within the bore section having the largest diameter is a spring 12. Spring 11 has one end bearing against the stepped piston 8 and opposite end bearing against the piston 9 to separate them to have them assume the illustrated position where the shoulder of the plunger is urged to abut with stepped piston 8. The spring 12 bears against the stepped piston 8 to urge the same in the release portion as illustrated in FIG. 3.

With the above construction, when second speed pressure P2 is supplied to the second servo apply chamber 2S/A, the stepped piston 8 together with the piston 9 are urged to move to the right as viewed in FIG. 3 and tightens the brake band 13 to apply the band brake B/B. In this state, supplying third speed pressure to the third speed servo release chamber 3S/R causes the stepped piston 8 to move to the right as viewed in FIG. 3 due to a difference in pressure acting area on the opposite sides of the stepped piston 8, thus releasing brake band 13 to release the application of band brake B/B. In this state, when fourth speed pressure P4 is supplied to the fourth speed servo apply chamber 4S/R, the piston 9 is urged to move to the left independent of the stepped piston 8, tightening the brake band 13 to apply the band brake B/B.

The power train shown in FIG. 2 is shiftable into one of first, second, third, and fourth speed ratio during forward travel or into reverse when selected one or ones of friction elements B/B, H/C, F/C, OR/C, LR/B, and R/C are activated in accordance with a pattern as shown in TABLE 1 in combination with activation of friction elements FO/C and LO/C. In TABLE 1, a selected one or ones of servo chambers 2S/A, 3S/R, and 4S/A assigned with the reference character "o" are supplied with hydraulic pressure, a selected one or ones of friction elements H/C, R/C, LR/B, and RC assigned with the reference character "o" are supplied with hydraulic pressure and activated. The reference character "x" denotes one or ones of friction elements OR/C and LR/B which are to be activated to effect engine brake running in a particular one of the forward speed ratios. When the overrun clutch OR/C is activated, forward one-way clutch FO/C arranged in parallel with the same is not in operation, while when the low and reverse brake LR/B is activated, low one-way clutch LO/C arranged in parallel with the same is not in operation.

Figure 1A:
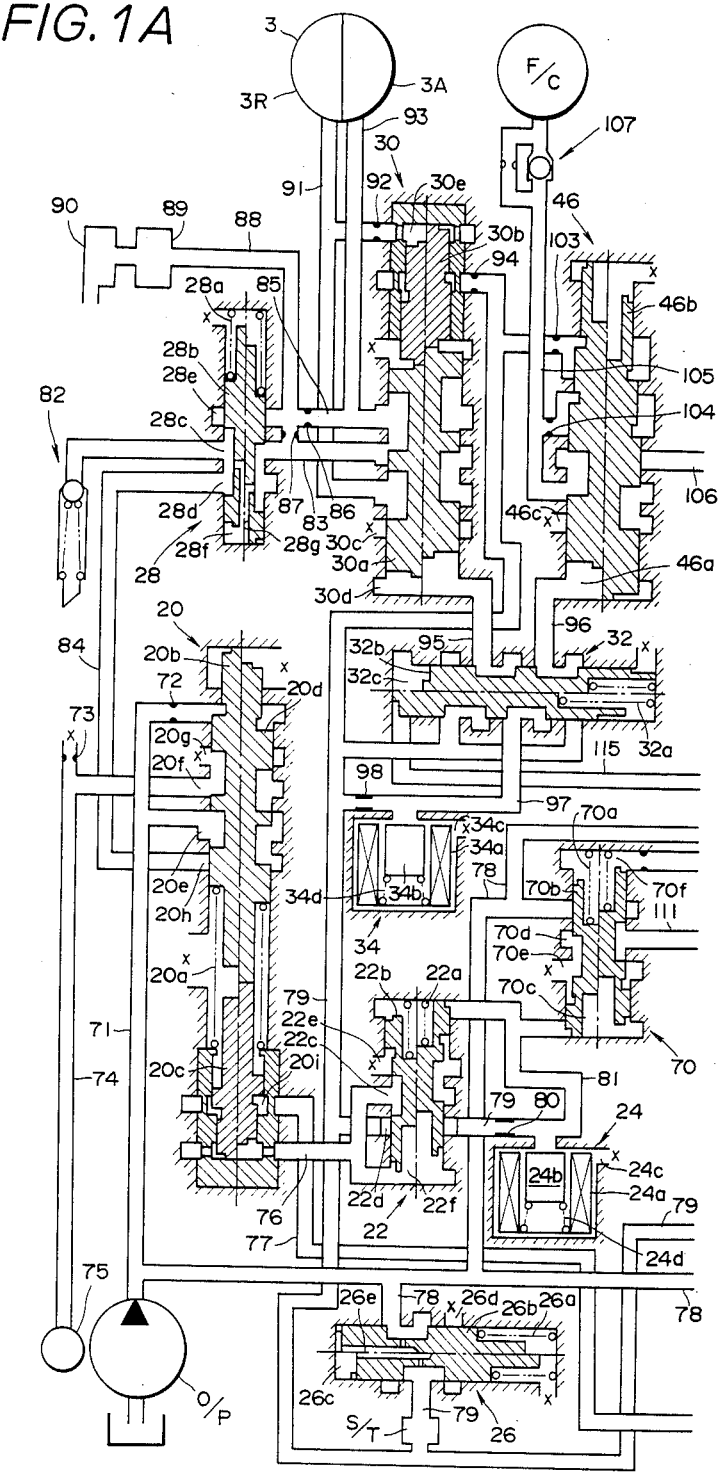
FIGS. 1A, 1B, and 1C, when combined side by side, illustrate a control system for an automatic transmission according to the present invention.
Figure 1B:
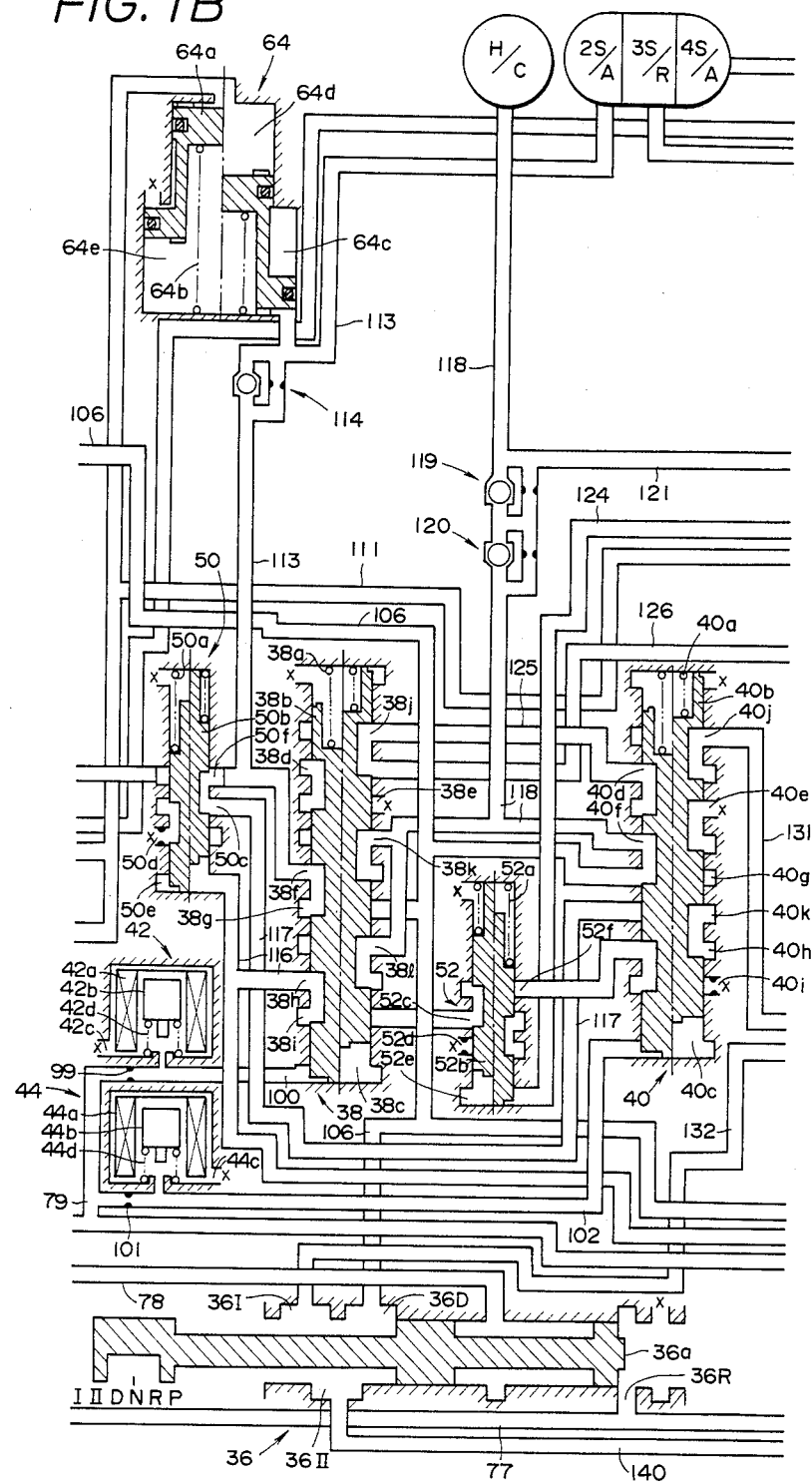
Figure 1C:
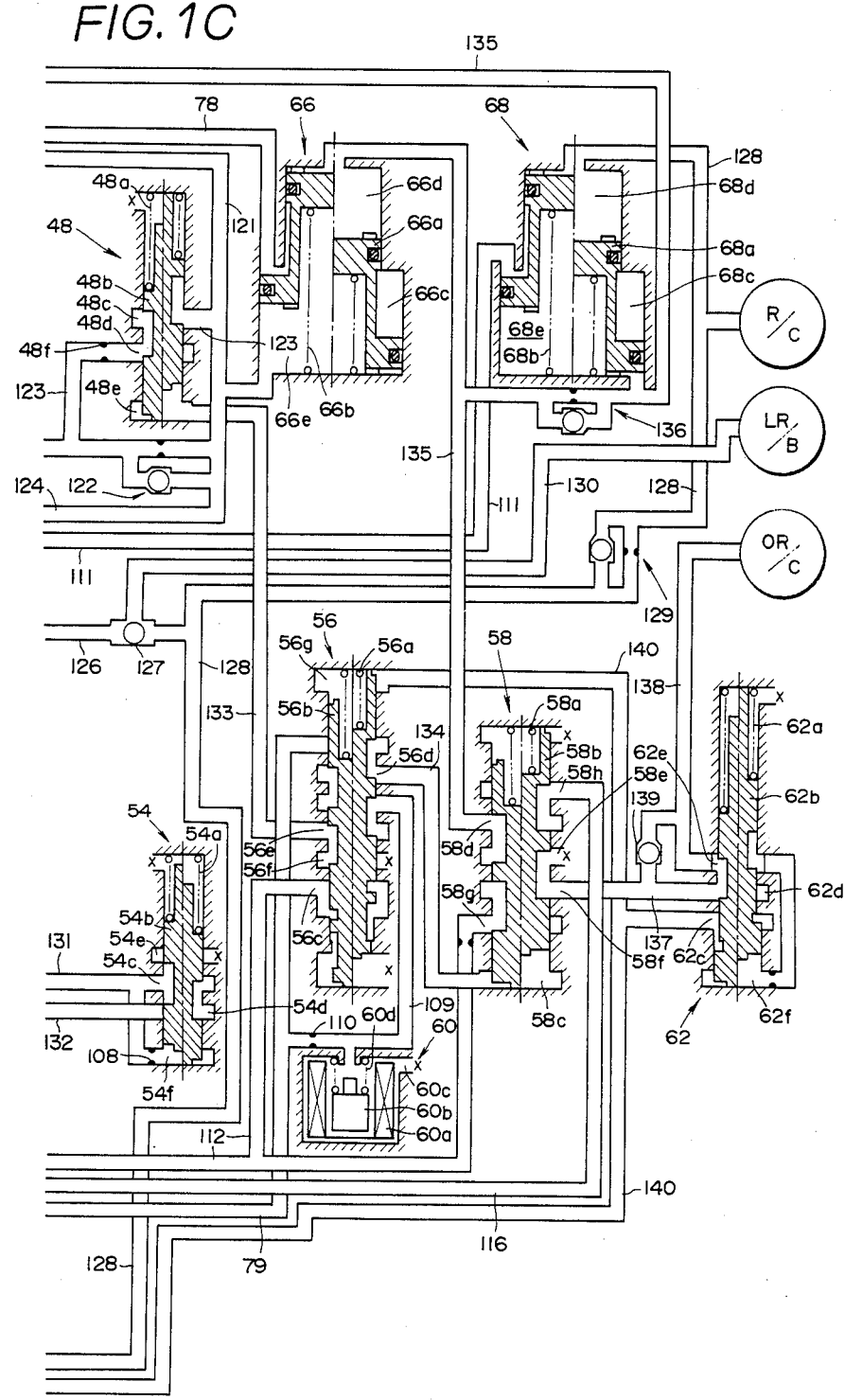

Referring to FIGS. 1A, 1B and 1C, a pressure regulator valve 20 shown in FIG. 1A comprises a spool 20a biased by a spring 20a to a spring set position illustrated by the left half thereof as viewed in FIG. 1A, and a plug 20c. Pressure regulator valve 20 regulates hydraulic fluid discharged to a circuit 71 by an oil pump O/P to generate a hydraulic fluid pressure that is determined by the spring force of spring 20a and the force biased by plug 20c to spool 20b. This hydraulic pressure resulting from the pressure regulation is used as a servo actuating fluid pressure and called as "line pressure." The hydraulic fluid pressure building up in circuit 71 acts via a damping orifice 72 on a pressure acting area 20d of spool 20b to urge the same to move downwards as viewed in FIG. 1A against spring 20a. Pressure regulator valve 20 is formed with four ports 20e, 20f, 20g, and 20h which are arranged such that they are opened or closed in response to which position spool 20b assumes during its stroke. Port 20e is connected to circuit 71 and it starts to communicate with ports 20h and 20f and increases its communication with them as spool 20b moves downwards from the spring set position as illustrated by the left half thereof in FIG. 1A. Port 20f decreases its communication with port 20g serving as a drain port as spool 20b moves downwards from the illustrated spring set position, and it starts to communicate with port 20e when it has interrupted its communication with drain port 20g. Port 20f is connected to a volume control actuator 75 for oil pump O/P via a circuit 74 provided with a bleeder orifice 73. Oil pump O/P is of a variable volume vane pump driven by the engine and its volume decreases to become small when the pressure supplied to volume control actuator 75 exceeds a predetermined value. Plug 20c of pressure regulator valve 20 has a bottom end serving as a pressure acting area which receives a modifier pressure from a circuit 76, and has a pressure acting area 20i a reverse select pressure from a circuit 77. Thus, plug 22c applies to spool 20b an upward force resulting from forces created by reception of the pressure modifier pressure or the reverse select pressure.

Initially, the pressure regulator valve 20 assumes the state as illustrated by the left half thereof as viewed in FIG. 1A. When the oil pump O/P starts discharging oil, the oil discharged flows into the circuit 71. When the spool 20b stays in the positon as illustrated by the left half thereof, the pressure rises within the circuit 71 because no oil is drained therefrom. This pressure is supplied via an orifice 72 to a pressure acting area 20d to act thereon, urging the spool 20b downwards against the spring 20a until the port 20e communicates with the port 20h. As a result, the above mentioned pressure is drained at the port 20h and thus drops, allowing the spool 20b for being pushed back by the spring 20a. Repeating these operations one after another causes the pressure regulator valve 20 to adjust the pressure within the circuit 71 (i.e., hereinafter called as a line pressure)

TABLE 1

|  | B/B | | | | | | | | | |
|---|---|---|---|---|---|---|---|---|---|---|
|  | 2S/A | 3S/R | 4S/A | H/C | F/C | FO/C | OR/C | LO/C | LR/B | R/C |
| REV. |  |  |  |  |  |  |  |  | o | o |
| FORW |  |  |  |  |  |  |  |  |  |  |
| 1st. |  |  |  |  | o | o | x | o | x |  |
| 2nd. | o |  |  |  | o | o | x |  |  |  |
| 3rd. | o | o |  | o | o | o | x |  |  |  |
| 4th. | o | o | o | o | o |  |  |  |  |  | to basically a value corresponding to the spring force of the spring 20a. The plug 20c, on the other hand, is subject to a modifier pressure acting upon the bottom end thereof and urges the spool 20h upwards after coming into abutting contact with the spool 20b as illustrated by the right half thereof as viewed in FIG. 1A in such a manner as to assist the action of the spring 20a. As will be later described, the modifier pressure appears when each of the drive ranges except the reverse drive range is selected and rises in proportion to the engine load (which corresponds to the engine output torque). Thus, the above mentioned line pressure varies such that it rises with an increase in the engine load.

When the reverse drive range is selected, a reverse select pressure as high as the line pressure is supplied through a circuit 77 to the pressure regulator valve 20 to act on the plug 20c in a direction to urge the same upwards, urging the spool 20b in the direction assisting the spring force of the spring 20a after the plug 20c has been brought into abutting contact with the spool 20b. This causes the line pressure to be boosted up to a relatively high predetermined value desired for reverse drive.

As the engine speed increases, the amount of oil discharged by the oil pump O/P increases. After the engine speed has exceeded a certain level, an overabundance amount of oil is discharged by the oil pump O/P, causing the pressure within the circuit 71 to rise above the value adjusted. This pressure rise causes the spool 20b to move downwards beyond the equilibrium position as illustrated by the right half thereof as viewed in FIG. 1A where the communication of the port 20f with the drain port 20g prevously established is blocked and the communication of the port 20f with the port 20h previously blocked is established, allowing the discharge of oil from the port 20e via the port 20f at a bleed 73 in a flow restricted manner, leaving a feedback pressure created within the circuit 74. This feedback pressure rises as the revolution speed of the oil pump O/P increases, causing the actuator 75 to bring down the eccentric amount (i.e., the pump capacity) of the oil pump O/P. As a result, the discharge amount of the oil pump O/P is kept constant while the revolution speed of the oil pump O/P is higher than the certain level, causing no power loss of the engine which would result if the oil pump were activated to discharge the overabundance amount of oil.

The line pressure created within the circuit 71 in the above described manner is distributed through a line pressure circuit 78 to a pilot valve 26, a manual selector valve 36, an accumulator control valve 70 and a servo release pressure accumulator 66.

The pilot valve 26 comprises a spool 26b biased by a spring 26a to a position as illustrated by the upper half thereof as viewed in FIG. 1A. The spool 26b has its remote end from the spring 26a exposed to a chamber 26c. The pilot valve 26 also includes a drain port 26d and is connected to a pilot pressure circuit 79 having therein a strainer S/T. The spool 26b is formed with a connecting passage 26e which allowing the transmission of the pressure from the pilot pressurre circuit 79 to the chamber 26c. As the pressure within the chamber 26c rises, the spool 26b is urged for rightward movement as viewed in FIG. 1A. This rightward movement of the spool 26b allows the pilot pressure circuit 79 to switch its connection from the line pressure circuit 78 to the drain port 26d.

With the pilot valve 26b held in the position as illustrated by the upper half thereof as viewed in FIG. 1A, supplying the line pressure from the circuit 78 to the pilot valve 26 causes a rise in pressure within the circuit 79. This rise in pressure is supplied via the connection passage 26e to the chamber 26c, causing the rightward movement of the spool 26b as viewed in FIG. 1A. This rightward movement of the spool 26b beyond the equilibrium state position as illustrated by the lower half thereof as viewed in FIG. 1A causes the circuit 79 to block its communication with the circuit 78 and at the same time open its communication with the drain port 26d. This results in a drop in pressure within the circuit 79, allowing the spool 26b to be pushed back by the spring 26a, causing the pressure within the circuit 79 to rise again. Thus, the pilot valve 26 reduces the line pressure from the circuit 78 down to a constant value that is determined by the spring force of the spring 26a and outputs the results to the circuit 79 as the pilot pressure.

This pilot pressure is supplied through the circuit 79 to the pressure modifier valve 22, duty solenoids 24, 34, a lock-up control valve 30, a forward clutch control valve 30, a forward clutch control valve 46, a shuttle valve 32, first, second and third shift solenoids 42, 44 and 60, and a shuttle valve 56.

The duty solenoid 24 comprises a coil 24a, a spring 24d and a plunger 24b. When the coil 24a is turned ON (i.e., when electric current passes through the coil 24a), the plunger 24b is electromagnetically drawn against the spring 24d to an open position where a circuit 81 that is connected to the circuit 79 via an orifice 80 is allowed to communicate with a drain port 24c. Under the control of a computer, not illustrated, the coil 24a of the duty solenoid 24 is turned ON intermittently. The ratio of ON time to the period which is constant (i.e., duty cycle) is controlled, causing pressure within the circuit 81 to vary in dependence on the duty cycle. The duty cycle ranges from 0% to 100% such that during operation with each of the drive ranges except that reverse drive range being selected, the duty cycle is decreased as the engine load (for example, the engine throttle opening degree) increases, and the duty cycle is set as 100% when the reverse drive range is selected. When the duty cycle is set as 100%, the control pressure within the circuit 81 is zero, whereas when it is set as 0%, the control pressure takes the maximum value.

The pressure modifier valve 22 comprises a spring 22a and a spool 22b which is biased downwards as viewed in FIG. 1A by means of the spring force of the spring 22a and a control pressure from the circuit 81. The pressure modifier valve 22 is provided with an outlet port 22c connected to the circuit 76, an inlet port 22d connected to the pilot pressure port 79, and a drain port 22e. The spool 22b has its remote end from the spring 22a exposed to a chamber 22f which the circuit 76 is connected to. The arrangement is such that upon the spool assuming a position as illustrated by the left half thereof as viewed in FIG. 1A, the port 22c becomes out of communication with the ports 22d and 22e.

In the pressure modifier valve 22, the spool 22b is urged downwards, as viewed in FIG. 1A, upon being subject to the spring force by the spring 22a and the control pressure supplied thereto from the circuit 81, whereas it is urged upwards upon being subject to the output pressure from the outlet port 22c. The spool 22b assumes the eqilibrium position where the forces acting on the spool 22b balance. If the upward force due to the output pressure acting on the spool 22b is insufficient for opposing to the downward forces due to the spring force and the control pressure acting on the spool 22b, the spool 22b tends to move downwards beyond the equilibrium position as illustrated by the left half thereof as viewed in FIG. 1A. This downward movement of the spool 22b uncovers the port 22d to allow it to communicate with the port 22c, allowing the supply of pilot pressure from the circuit 79 to the port 22c, thus causing a rise in the output pressure. If the upward force due to the output pressure acting on the spool 22b is excessively large for opposing to the downward forces, the spool 22b moves upwards toward a position as illustrated by the right half thereof as viewed in FIG. 1A. In this position of the spool 22b, the port 22c is allowed to communicate with the drain port 22e, causing a drop in the output pressure. After repeating these operations, the pressure modifier valve 22 adjusts the output pressure from the port 22c to a value corresponding to the sum of the spring force of the spring 22a and the force due to the control pressure from the circuit 81, and supplies the output pressure, as a modifier pressure, through the circuit 76 to the plug 20c of the pressure regulator valve 20. With this modifier pressure resulting from amplification of the control pressure by the spring force of the spring 22a, the line pressure is controlled such that it rises as the engine load increases during operation with each of the drive ranges except the reverse drive range being selected because the control pressure rises as the engine load increases although it is zero during operation with the reverse drive selected.

The torque converter regulator valve 28 comprises a spring 28a, and a spool 28b biased by the spring to a position as illustrated by the right half thereof as viewed in FIG. 1A. It is formed with ports 28c and 28d which are kept communicating with each other during the stroke of the spool 28b between the position as illustrated by the left half thereof and the position as illustrated by the right half thereof as viewed in FIG. 1A. As it moves upwards from the position as illustrated by the left half thereof as viewed in FIG. 1A, the spool 28b begins covering the port 28d and uncovering the port 28e, reducing the degree of the communication of the port 28c with the port 28d and increasing the degree of communication of the port 28c with the port 28e. In order to control the stroke of the spool, the spool 28b has its remote end from the spring 28a exposed to a chamber 28f and it has formed therethrough a connecting passage with which the chamber 28f communicates always with the port 28c. The port 28c is connected to predetermined portions to be lubricated via a relief valve 82 and also to the lock-up control valve 30 via a circuit 83. The port 28d is connected via a circuit 84 to the pressure regulator valve 20 at the port 20h. The port 28e is also connected to the lock-up control valve 30 via a circuit 85. This circuit 85 is provided with an orifice 86 and it has a portion thereof between the orifice 86 and the port 28e connected to the circuit 83 via an orifice 87 and also to an oil cooler 89 and parts 90 to be lubricated via a circuit 88.

Initially, the torque converter regulator valve 28 assumes the position as illustrated by the right half thereof as viewed in FIG. 1A. Under this condition, oil supplied thereto from the port 20h of the pressure regulator valve 20 via the circuit 84 is allowed to pass through the circuit 83 to the torque converter 3 in the manner described later, causing a torque converter supply pressure to build up at the port 28d. This torque converter supply pressure is supplied to the chamber 28f via the connection passage 28g, urging the spool 28b upwards, as viewed in FIG. 1A against the spring 28a. When the spool 28b moves upwards beyond the position as illustrated by the left half thereof as viewed in FIG. 1A, it begins to uncover the port 28e, allowing the discharge of oil through the port 28e and circuit 88. This causes the torque converter supply pressure to be adjusted to a value determined by the spring force of the spring 28a. The oil discharged from the circuit 88 is directed toward the lubrication parts 90 after being subject to cooling by the oil cooler 89. If the torque converter supply pressure exceeds the above mentioned value as a result of the above mentioned pressure regulation, the relief valve 82 opens to relieve the excessive pressure toward the lubrication parts so as to avoid deformation of the torque converter 3.

The lock-up control valve 30 comprises a spool 30a and a plug 30b which are arranged along an axis. When the spool 30a assumes a position as illustrated by the right half thereof as viewed in FIG. 1A, the circuit 83 is allowed to communicate with a circuit 91 leading to a torque converter release chamber 3R, while when it moves downward to a position as illustrated by the left half thereof as viewed in FIG. 1A, the circuit 83 is now allowed to communicate with the circuit 85. When the spool 30a moves downwards beyond the position as illustrated by the left half thereof as viewed in FIG. 1A, the circuit 91 is allowed to communicate with a drain port 30c. In order to control the stroke of the spool 30a, the spool 30a has its remote end from the plug 30b exposed to a chamber 30d, and the plug 30b has its remote end from the spool 30a exposed to a chamber 30e which the pressure within the circuit 91 is supplied thereto via an orifice 92. There is provided a circuit 91 extending from a torque converter apply chamber 3A which is connected to the circuit 85 at a portion between the orifice 86 and the lock-up control valve 30. The plug 30b is subject to a downward force resulting from the pilot pressure acting thereon from the circuit 79 via an orifice 94, preventing pulsation of the spool 30a.

In the lock-up control valve 30, the stroke of the spool 30a is controlled by pressure supplied to a chamber 30d. When this pressure is sufficiently high, the spool 30a assumes a position as illustrated by the right half thereof as viewed in FIG. 1A. In the position of the spool 30a, the oil from the circuit 83 which is under pressure regulation by the torque converter regulator valve 28 passes through the circuit 91, release chamber 3R, apply chamber 3A, circuit 93 and circuit 85 to the circuit 88 where it is discharged. Under this condition, the torque converter 3 performs power transmission in its converter state. As the pressure within the chamber 30d drops, the spool 30a is urged for downward movement, as viewed in FIG. 1A, by means of the plug 30b due to pressure acting thereon via the orifices 92 and 94. When, during this downward movement, the spool 30a moves downward beyond the position as illustrated by the left half thereof as viewed in FIG. 1A, the oil under regulation from the circuit 83 passes through the circuits 85, 93, apply chamber 3A, release chamber 3R and circuit 91 to the drain port 30c Thus, the torque converter performs the power transmission in a slip state with a rate controlled in proportion to a drop in the pressure within the chamber 30d of the torque converter 3. Further drop in the pressure within the chamber 30d causes further downward movement of the spool 30a beyond this state. This causes the circuit 91 to fully communicate with the drain port 30c, bringing down the pressure within the release chamber 3R to zero, allowing the torque converter 3 to perform the power transmission in a lock-up state.

The shuttle valve 32 is designed to effect stroke control of the lock-up control valve 30 as well as that of the forward clutch control valve 46 later described. It includes a spool 32b biased by a spring 32a to a position as illustrated by the lower half thereof as viewed in FIG. 1A. This spool 32b is movable to a position as illustrated by the upper half thereof as viewed in FIG. 1A in response to pressure within a chamber 32c. When the spool 32b assumes the position as illustrated by the lower half thereof as viewed in FIG. 1A, the shuttle valve 32 allows the circuit 95 from the chamber 30d to communicate with the pilot pressure circuit 79 and a circuit 96 from a chamber 46a of the forward clutch control valve 46 to communicate with a circuit 97 from a duty solenoid 34. When the spool 32b moves to the position as illustrated by the upper half thereof, the shuttle valve 32 allows the circuit 95 to communicate with the circuit 97 and the circuit 96 to communicate with the circuit 79.

The duty solenoid 34 comprises a coil 34a, a spring 34d and a plunger 34b biased to a close position by the spring 34d. When the coil 34a is turned ON (i.e., when electric current passes through the coil 24a), the plunger 34b is electromagnetically drawn against the spring 34d to an open position where a circuit 79 that is connected to the circuit 79 via an orifice 98 is allowed to communicate with a drain port 34c. Under the control of a computer, not illustrated, the coil 34a of the duty solenoid 34 is turned ON intermittently. The ratio of ON time to the period which is constant (i.e., duty cycle) is controlled, causing pressure within the circuit 97 to vary in dependence on the duty cycle. In the case where the shuttle valve 32 assumes the position as illustrated by the upper half thereof and the control pressure within the circuit 97 is used to effect the stroke control of the lock-up control valve 30, the duty cycle of the solenoid 34 is determined as follows. That is, the duty cycle should be 0% to allow the control pressure within the circuit 97 to increase as high as the pilot pressure within the cicuit 79 when the engine operates with heavy load at low speeds where the torque multiplying function of the torque converter 3 and the torque variation absorbing function thereof are required. Under this condition, the control pressure supplied to the chamber 30d urges the spool 30a to the position as illustrated by the right half thereof, rendering the torque converter 3 to operate in the torque converter state as desired. As the requirement degree of the above mentioned two functions imposed on the torque converter 3 decreases, the duty cycle should be increased to bring down the control pressure, rendering the torque converter 3 to operate in the desired slip state. When the engine operates with light load at high speeds where the above mentioned functions of the torque converter are not required, the duty cycle should be 100% to bring down the control pressure to zero, allowing the torque converter 3 to operate in the lock-up state.

In the case where the shuttle valve 32 assumes the position as illustrated by the lower half thereof as viewed in FIG. 1A and the control pressure within the circuit 97 is used to effect the stroke control of the forward clutch control valve 46, the duty cycle of the solenoid 34 is determined in such a manner later described that N-D select shock is alleviated and creep is prevented.

The manual selector valve 36 comprises a spool 36a which is movable depending on manual select operation of a driver to a park (P) range, a reverse (R) range, a neutral (N) range, a forward automatic drive (D) range, a forward second speed engine brake (II) range, a forward first speed ratio engine brake (I) range. Selecting one of the above mentioned ranges causes the line pressure line pressure circuit 78 to communicate the corresponding one of the output ports 36 D, 36 II, 36 I, and 36 R in accordance with the pattern shown by the following table.

TABLE 2

| Port | Range | | | | | |
|------|---|---|---|---|---|---|
|      | P | R | N | D | II | I |
| 36 R |   | o |   |   |   |   |
| 36 D |   |   |   | o | o | o |
| 36 II |   |   |   |   | o | o |
| 36 I |   |   |   |   |   | o |

In the above TABLE, the reference character "o" denotes the particular port which communicates with the line pressure circuit 78, while the other ports which are not denoted by this reference character are drained.

The first shift valve 38 comprises a spring 38a and a spool 38b biased by the spring 38a to a position as illustrated by the left half thereof as viewed in FIG. 1B. This spool 38b assumes a position as illustrated by the right half thereof as viewed in FIG. 1A when a pressure is supplied to a chamber 38c. When the spool 38b assumes the position as illustrated by the left half thereof as viewed in FIG. 1B, the first shift valve 38 allows a port 38d to communicate with a drain port 38e, a port 38f to communicate with a port 38g, and a port 38h to communicate with a port 38i. When the spool 38b assumes the position as illustrated by the right half thereof as viewed in FIG. 1B, the first shift valve 38 allows the port 38d to communicate with a port 38j, the port 38f to communicate with a port 38k, and the port 38h to communicate with a port 38l.

The second shift valve 40 comprises a spring 40a and a spool 40b biased by the spring 40a to a position as illustrated by the left half thereof as viewed in FIG. 1B. This spool 38b assumes a position as illustrated by the right half thereof as viewed in FIG. 1A when a pressure is supplied to a chamber 40c. When the spool 40b assumes the position as illustrated by the left half thereof as viewed in FIG. 1B, the second shift valve 40 allows a port 40d to communicate with a drain port 40e, a port 40f to communicate with a port 40g, and a port 40h to communicate with a drain port 40i via an orifice. When the spool 40b assumes the position as illustrated by the right half thereof as viewed in FIG. 1B, the second shift valve 40 allows the port 40d to communicate with the port 40j, the port 40f to communicate with the port 40e, and the port 40h to communicate with a port 40k.

The spool positions of the first and second shift valves 38 and 40 are controlled by a first shift solenoid 42 and a second shift solenoid 44, respectively. These shift solenoids comprise coils 42a and 44a, respectively, plungers 42b and 44b, respectively, and springs 42d and 44d, respectively. The first shift solenoid 42 is connected to the pilot pressure circuit 79 via an orifice 99, and it blocks communication between a circuit 100 leading to a chamber 38c and a drain port 42c when the coil 42a is turned ON (i.e., when the current passes through the coil 42a), allowing a control pressure within the circuit 100 to increase as high as the pilot pressure, uring the first shift valve 38 to move to the position as illustrated by the right half thereof as viewed in FIG. 1B. The second shift solenoid 44 is connected to the pilot pressure circuit 79 via an orifice 101, and it blocks communication between a circuit 102 leading to a chamber 40c and a drain port 44c when the coil 44a is turned ON (i.e., when the current passes through the coil 44a), allowing a control pressure within the circuit 102 to increase as high as the pilot pressure, urging the second shift valve 40 to move to the position as illustrated by the right half thereof as viewed in FIG. 1B.

The first to fourth speed ratios are established depending on various combinations of ON and OFF of the shift solenoids, i.e., various combinations of upshift and downshift positions of the shift valves 38 and 40, in accordance with the pattern shown in the following TABLE 3.

TABLE 3

| Element | Speed | | | |
|---|---|---|---|---|
| | 1st | 2nd | 3rd | 4th |
| 1st Shift Solenoid 42 | ON | OFF | OFF | ON |
| 1st Shift Valve 38 | o | x | x | o |
| 2nd Shift Solenoid 44 | ON | ON | OFF | OFF |
| 2nd Shift Valve 40 | o | o | x | x |

In the above TABLE, the reference character "o" represents the state where the shift valve is in the position as illustrated by the right half thereof as viewed in FIG. 1B, while the reference character "x" represents the state where the shift valve is in the position as illustrated by the left half thereof as viewed in FIG. 1B. The ON and OFF of the shift solenoids 42 and 44 are determined by the computer, not illustrated, versus vehicle speed and engine load in accordance with a predetermined shift pattern so as to establish an appropriate speed ratio for the vehicle speed and the engine load.

The forward clutch control valve 46 comprises a spool 46b. For preventing the pulsation of the spool 46b, the pilot pressure supplied to the forward clutch control valve 46 from the circuit 79 via an orifice 103 acts on the spool 46b in a downward direction as viewed in FIG. 1A. The spool 46b ia subject to another downward force, too, created by the actuating pressure for the forward clutch F/C supplied, as a feedback pressure, to the clutch control valve 46 from a circuit 105 via an orifice 104 to act on the spool 46b. The spool 46b will move to a position where the above mentioned downward forces balance with an upward force due to the pressure within the chamber 46a. When the spool 46b assumes the position as illustrated by the right half thereof as viewed in FIG. 1A, the circuit 105 is allowed to communicate with a drain port 46c, whereas when it assumes the position as illustrated by the left half thereof, the circuit 105 is allowed to communicate with a circuit 106. The circuit 105 is provided with a one-way orifice 107 which has a throttle effect only upon the hydraulic pressure directed toward the forward clutch F/C. The circuit 106 is connected to the port 36 D of the manual selector valve 36.

The 3-2 timing valve 48 comprises a spring 48a and a spool 48b biased toward a position as illustrated by the left half thereof as viewed in FIG. 1C where a port 48c is allowed to communicate with a port 48d having an orifice 48f. When a pressure within a chamber 48e is high enough to urge the spool 48b to the position as illustrated by the right half thereof as viewed in FIG. 1C, the communication between the ports 48c and 48d is blocked.

The 4-2 relay valve 50 comprises a spring 50a and a spool 50b biased by the spring 50a to a position as illustrated by the left half thereof as viewed in FIG. 1B where a port 50c is allowed to communicate with a drain port 50d having an orifice therein. When a pressure within a chamber 50e is high enough to urge the spool 50b to a position as illustrated by the right half thereof as viewed in FIG. 1B, the port 50c is allowed to communicate with a port 50f.

The 4-2 sequence valve 52 comprises a spring 52a and a spool 52b biased by the spring 52a to a position as illustrated by the right half thereof as viewed in FIG. 1B where a port 52c is allowed to communicate with a drain port 52d having therein an orifice. When a pressure within a chamber 52e is high enough to urge the spool 52b to a position as illustrated by the left half thereof as viewed in FIG. 1B, the port 52c is allowed to communicate with a port 5f.

The I range pressure reduction valve 54 comprises a spring 54a and a spool 54b biased by the spring 54a to a position as illustrated by the right half thereof as viewed in FIG. 1C. It is formed with ports 54c and 54d which are allowed to communicate with each other when the spool 54b assume the position as illustrated by the right half thereof. It is also formed with a drain port 54e which begins to communicate with the port 54c when the spool 54b has moved upwards beyond a position as illustrated by the left half thereof as viewed in FIG. 1C where the spool 54d completely covers the port 54d. The spool 54b has its remote end from the spring 54a exposed to a chamber 54f connected to the port 54c via an orifice 108. Initially, the I range pressure reduction valve 54 assumes the position as illustrated by the right half thereof as viewed in FIG. 1C where supplying the port 54d with a pressure causes the pressure to appear, as an output pressure, at the port 54c. This output pressure acts via the orifice 108 upon the bottom end, as viewed in FIG. 1C of the spool 54b, urging the spool 54b for upward movement as the output pressure rises. When, during this upward movement, the spool 54b moves upwards beyond the position as illustrated by the left half thereof as viewed in FIG. 1C, the port 54c begins to communicate with the drain port 54e, causing a drop in the output pressure from the port 54c. This pressure drop causes downward movement of the spool 54b. When the spool moves downwards beyond the position as illustrated by the left half thereof as viewed in FIG. 1C, the port 54c begins to communicate with the port 54d, causing an increase in the outoput pressure from the port 54c. Repeating these operations results in providing the output pressure from the port 54c having a constant value that is determined by the spring force of the spring 54a.

The shuttle valve 56 comprises a spring 56a and a spool 56b biased by the spring 56a to a position as illustrated by the left half thereof as viewed in FIG. 1C. The spool 56b keeps on staying in this position as long as a chamber 56g is supplied with a pressure. Under a condition where there is no supply of pressure to the chamber 56g, when an upward force due to the pressure from the port 56c and applied to the spool 56b is higher than a predetermined value, the spool 56b is urged to move upwards to a position as illustrated by the right half thereof as viewed in FIG. 1C. In the position as illustrated by the left half thereof as viewed in FIG. 1C, a port 56d is allowed to communicate with a circuit 109 from a third shift solenoid 60, and a port 56e is allowed to communicate with a drain port 56f. In the position as illustrated by the right half thereof as viewed in FIG. 1C, the port 56d is allowed to communicate with the pilot pressure circuit 79 and the port 56e is allowed to communicate with the circuit 109.

The third shaft solenoid 60 comprises a coil 60a, a plunger 60b and a spring 60d. When the coil 60a is turned ON (i.e., when the current passes through the coil 60a), the plunger 60b is urged against the spring 60d to assume a position where the circuit 109 connected via an orifice 110 to the pilot pressure circuit 79 is prevented from communicating with a drain port 60c, causing a control pressure within the circuit 109 to increase as high as the pilot pressure. ON and OFF of the third shift solenoid 60 are determined by the computer, not illustrated, in a manner later described.

The overrun clutch control valve 58 comprises a spring 58a and a spool 58b biased by the spring 58a to a position as illustrated by the left half thereof as viewed in FIG. 1C. This spool 58b moves to a position as illustrated by the right half thereof as viewed in FIG. 1C when a chamber 58c is supplied with a pressure. In the position as illustrated by the left half thereof as viewed in FIG. 1C, the spool 58b allows a port 58d to communicate with a drain port 58e, and a port 58f to communicate with a port 58g. In the position as illustrated by the right half thereof as viewed in FIG. 1C, the spool 58b allows the port 58d to communicate with a port 58h and the port 58f to communicate with the drain port 58e.

The overrun clutch pressure reduction valve 62 comprises a spring 62a and a spool 62b biased by the spring 62a to a position as illustrated by the left half thereof as viewed in FIG. 1C. This spool 62b is held in this position under a downward force, as viewed in FIG. 1C, treated when a port 62c is supplied with a pressure. Under a condition where there is no pressure inflow from a port 62c, supplying a port 62d with hydraulic pressure causes an increase in output pressure from a port 62e. This output pressure is fed back to a chamber 62f, urging the spool 62b for upward movement as viewed in FIG. 1C. When the output pressure attains a value corresponding to the spring force of the spring 62a, the spool 62b assumes a position as illustrated by the right half thereof as viewed in FIG. 1C where the communication between the ports 62d and 62e is blocked. As a result, the overrun clutch reduction valve 62 effects pressure reduction to adjust the output pressure from the port 62e at a constant value that is determined by the spring force of the spring 62a.

The second speed ratio servo apply pressure accumulator 64 comprises a stepped piston 64a biased by a spring 64b to a position as illustrated by the left half thereof as viewed in FIG. 1B. The stepped piston 64a has a shoulder thereof exposed to a chamber 64c open to the ambient atmosphere. It has a small diameter piston end and a large diameter piston end exposed to sealed chambers 64d and 64e, respectively.

The third speed ratio servo release pressure accumulator 66 comprises a stepped piston 66a biased by a spring 66b to a position as illustrated by the left half thereof as viewed in FIG. 1C. The stepped piston 66a has a shoulder exposed to a chamber 66c which the line pressure circuit 78 is connected to. It has a small diameter piston end a large diameter piston end exposed to sealed chambers 66d and 66e, respectively.

The fourth speed ratio servo apply pressure accumulator 68 comprises a stepped piston 68a biased by a spring 68b to a position as illustrated by the left half thereof as viewed in FIG. 1C. The stepped piston 68a has a shoulder exposed to a sealed chamber 68c. It has a small diameter piston end and a large diameter piston end exposed to sealed chambers 68d and 68e, respectively.

The accumulator control valve 70 comprises a spring 70a and a spool 70b biased by the spring 70a to a position as illustrated by the left half thereof as viewed in FIG. 1A. The spool 70b has its remote end from the spring 70a exposed to a chamber 70c which the control pressure is supplied to from the circuit 81. In its position as illustrated by the left half thereof as viewed in FIG. 1A, the spool 70b allows an outlet port 70d to communicate with a drain port 70e. When the spool 70b moves upwards to a position as illustrated by the right half thereof as viewed in FIG. 1A in response to a rise in the control pressure supplied to the chamber 70c, the spool 70b allows the outlet port 70d to communicate with the line pressure circuit 78. The outlet port 70d is connected to the chambers 64d and 68c of the accumulators 64 and 68, respectively, via a circuit 111, and it is also connected to a chamber 70f receiving therein the spring 70a.

The spool 70b of the accumulator control valve 70 is urged to move upwards, as viewed in FIG. 1A, further beyond a position as illustrated by the right half thereof as viewed in FIG. 1B in response to the control pressure supplied to the chamber 70c upon selecting one of the drive ranges excluding the reverse drive. In this position, the line pressure from the circuit 78 is allowed to output to the circuit 111. When the pressure within the circuit 111 increases a value corresponding to the above mentioned control pressure, the spool 70b assumes the position as illustrated by the right half thereof as viewed in FIG. 1A. In this manner, the hydraulic pressure within the circuit 111 is adjusted to the value corresponding to the control pressure. Since, as previously described, the control pressure increases in proportion to engine load during operation with one of drive ranges excluding the reverse drive range, the hydraulic pressure within the chambers 64d and 68c of the accumulators 64 and 68 supplied thereto from the circuit 111 will increase in proportion to engine output torque. Upon selecting the reverse drive range, the control pressure is zero so that no hydraulic pressure is output to the circuit 111.

Hereinafter, the hydraulic fluid pressure network is further described. A circuit 106 extending from the port 36 D of the manual selector valve 36 has middle portions connected to the port 38g of the first shift valve 38 and the port 40g of the second shift valve 40. It has a branch circuit 112 connected to the port 56c of the shuttle valve 56 and also to the port 58g of the overrun clutch control valve 58. The port 38f of the first shift valve 38 is connected via a circuit 113 to the port 50f of the 4–2 relay valve 50 and it is also connected via a one-way orifice 114 to the accumulator's chamber 64e and the second speed ratio servo apply chamber 2S/A, and the port 50f is connected via the circuit 115 to the chamber 32c of the shutter valve 32, too. Furthermore, the port 38h of the first shift valve 38 is connected via a circuit 116 to the chamber 50e of the 4–2 relay valve 50 and the port 58h of the overrun clutch control valve 58, while the port 50c of the 4–2 relay valve 50 is connected via a circuit 117 to the port 40k of the second shift valve 40. The ports 38k and 38l of the first shift valve 38 and the port 40f of the second shift valve 40 are connected via a circuit 118 to the high clutch H/C. The circuit 118 is provided with one-way orifices 119 and 120 arranged as directed to the opposite directions. Separated from the circuit 118 at a portion between these orifices 119 and 120 and the high clutch H/C is a branch circuit 121 which is connected via a one-way orifice 122 to the third speed ratio servo release chamber 3S/R and the accumulator chamber 66e. There is a circuit 123 connected to the circuit 121 bypassing the orifice 122, and the 3-2 timing valve 48 forms part of this circuit 123 with their ports 48c and 48d connected within the circuit 123. Separated from the circuit 121 at a portion between the one-way orifice 122 and the third speed ratio servo release chamber 3S/R is a circuit 124 which is connected to the chamber 52e of the 4-2 sequence valve 52. The ports 52c and 52f of the 4-2 sequence valve 52 are connected to the port 38i of the first shift valve 38 and the port 40h of the second shift valve 40, respectively.

The first shift valve 38 has its port 38j connected via a circuit 125 to the port 40d of the second shift valve 40, and its port 38d connected via a circuit 126 to one of two inlet ports of a shuttle ball 127. The other inlet port of the shuttle ball 127 is connected to a circuit 128 which is connected at one end to the port 36 R of the manual selector valve 36 where the bore mentioned circuit 77 is connected and which is connected on the other end to the reverse clutch R/C and the accumulator chamber 68d via a one-way orifice 129. The shuttle ball 127 has its outlet port connected via a circuit 130 to the low and reverse brake LR/B. The port 40j of the second shift valve 40 is connected via a circuit 131 to the port 54c and the chamber 54f of the I range pressure reduction valve 54. The port 54d of the I range pressure reduction valve 54 is connected via a circuit 132 to the port 36 I of the manual selector valve 36.

The shuttle valve 56 has its port 56e connected via a circuit 133 to the chamber 48e of the 3-2 timing valve 48, and its port 56d connected via a circuit 134 to the chamber 58c of the overrun clutch control valve 58. The port 58d of the overrun clutch control valve 58 is connected via a circuit 135 to the accumulator chamber 66d, and also to the accumulator chamber 68e and the fourth speed ratio servo apply chamber 4S/A via a one-way orifice 136. The port 58f of the overrun clutch valve 58 is connected via a circuit 137 to the port 62f of the overrun clutch reduction valve 62. The overrun clutch pressure reduction valve 62 has its port 62e connected via a circuit 138 to the overrun clutch OR/C. A check valve 139 is connected between the circuits 137 and 138. The port 62c of the overrun clutch pressure reduction valve 62 is connected via a circuit 140 to the port 36 II of the manual selector valve 36 and the chamber 56g of the shuttle valve 56.

The operation of the control system is hereinafter described.

The pressure regulator valve 20, pressure modifier valve 22, and duty solenoid 24 operate in the previously described manner so that the oil discharged by the oil pump O/P is regulated to provide the line pressure that rises in proportion to the engine output torque during the drive ranges excluding the reverse drive range and that is kept constant during the reverse drive range, and this line pressure is supplied to the circuit 78. This line pressure reaches the pilot valve 26, manual selector valve 36, accumulator control valve 70, and accumulator 66, keeping the accumulator 66 at the position as illustrated by the right half thereof as viewed in FIG. 1B. During the drive ranges excluding the reverse drive range, the accumulator control valve 70 supplies, via the circuit 111, the chambers 64d and 68c of the accumulators 64 and 68 with an accumulator backup pressure (i.e., the line pressure) that is variable in proportion to the engine output torque, urging these accumulators to assume the positions as illustrated by the right halves thereof as viewed in FIGS. 1B and 1C, respectively. During the reverse drive, the accumulator control valve 70 brings down the accumulator backup pressure to zero, allowing the accumulators 64 and 68 to assume the positions as illustrated by the left halves thereof as viewed in FIGS. 1B and 1C, respectively. The pilot valve 26 always outputs the constant pilot pressure to the circuit 79.

P, N RANGE

When the driver places the manual selector valve 36 at the P range or N range, all of the ports 36 D, 36 II, 36 I and 36 R of the manual selector valve 36 serve as drain ports. Since the line pressure does not come out of these ports, the forward clutch F/C, high clutch H/C, band brake B/B, reverse clutch R/C, low and reverse brake LR/B, and overrun clutch OR/C are all held deactivated because they are activated on the line pressure coming out of these ports of the manual selector valve 36. This renders the power train shown in FIG. 2 in the neutral state where the power transmission is impossible.

D RANGE

When the driver places the manual selector valve 36 at the D range, the automatic shift is effected in the following manner:

(First Speed Ratio)

With the manual selector valve 36 placed at the D range, the line pressure from the circuit 78 is supplied to the port 36 D as shown by the TABLE 2. As a D range pressure, the line pressure from the port 36 D is supplied via the circuit 106 to the port 38g of the first shift valve 38, the port 40g of the second shift valve 40 and the forward clutch control valve 46, and it also supplied via the circuit 112 to the port 56c of the shuttle valve 56 and the port 58g of the overrun clutch control valve 58.

When the vehicle is at a standstill with the manual selector valve 36 placed at the D range, the computer causes the first shift solenoid 42 and the second shift solenoid 44 to be turned ON, causing the first shift valve 38 and the second shift valve 40 to assume the positions as illustrated by the right halves thereof, respectively, as viewed in FIG. 1B. As a result, the high clutch H/C is allowed to communicate via the circuit 118 and the port 40f with the drain port 40e, and thus it is deactivated. The band brake B/B is deactivated because the second speed ratio servo apply chamber 2S/R, the third speed ratio servo release chamber 3S/R and the fourth speed ratio servo apply chamber 4S/A communicate with the same drain port 40e. The second speed ratio servo apply chamber 2S/A is allowed to communicate via the circuit 113, the port 38f, the port 38k, the circuit 118 and the port 40f with the drain port 40e. The third speed ratio servo release chamber 3S/R is allowed to communicate via the circuit 121, the circuit 118,and the port 40f with the drain port 40e. The fourth speed ratio servo apply chamber 4S/A is allowed to communicate with the same drain port 40e in the manner hereinafter described. As long as the engine output torque is higher than a certain level, since it rises in proportion to the engine output torque, the D range pressure (i.e., line pressure) supplied to the port 56c of the shuttle valve 56 keeps the spool 56b at the position as illustrated by the right half thereof as viewed in FIG. 1C where the pilot pressure within the circuit 79 is admitted via the circuit 134 to the overrun clutch control valve 58, urging this valve 58 to the position as illustrated by the right half thereof as viewed in FIG. 1C. The overrun clutch control valve 58 is kept at the position as illustrated by the right half thereof as viewed in FIG. 1C even when the engine output torque is not higher than the certain level and the shuttle valve 56 stays in the position as illustrated by the left half thereof as viewed in FIG. 1C because unless there is no engine brake command later described, the third shift solenoid 60 is turned ON under the control of the computer in order to cause the control pressure directed to the overrun clutch control valve 58 via the circuits 109 and 134 as high as the above mentioned pilot pressure. Under these conditions, therefore, the fourth speed ratio servo apply chamber 4S/A is allowed to communicate via the circuit 135, the ports 58d, 58h, the circuit 116, the ports 38h, 38l, the circuit 118 and the port 40f with the drain port 40e.

Besides, the reverse clutch R/C is drained via a circuit 128 at the port 36 R, and thus it is deactivated. The low and reverse brake LR/B is drained in the manner described hereinafter and thus deactivated. That is, the shuttle ball 127, which has its outlet port connected to the circuit 130 communicating with the low and reverse brake LR/B, has one of its two inlet ports connected to the circuit 128 that is drained as described and the other inlet port connected to the circuit 126 that is in turn connected via the port 38d, 38j, the circuit 125, the ports 40d, 40j, and the circuit 131 to the I range pressure reduction valve 54. Since it is not subject to pressure from the port 36 I of the manual selector valve 36 and thus left in the position as illustrated by the right half thereof as viewed in FIG. 1C, the low and reverse brake LR/B is drained at the port 36 I via the circuit 132 and deactivated. The overrun clutch OR/C is allowed to communicate via the circuit 138, check valve 139 and the port 58f with the drain port 58e since the overrun clutch control valve 58 is held in the position as illustrated by the right half thereof as viewed in FIG. 1C for the previously mentioned reason, and thus it is deactivated.

As previously described, there exists no hydraulic pressure within the circuit 113 that leads to the second speed ratio servo apply chamber 2S/A so that the shuttle valve 32 stays in the position as illustrated by the lower half thereof as viewed in FIG. 1A because the chamber 32c is connected to the circuit 113 via the circuit 115. With the shuttle valve 32 in the position as illustrated by the lower half thereof, the pilot pressure within the circuit 79 is supplied via the circuit 95 to the chamber 30d, urging the lock-up control valve 30 to the position as illustrated by the right half thereof as viewed in FIG. 1A, rendering the torque converter 3 operable in the converter state. In this position, the shuttle valve 32 allows the supply of the control pressure within the circuit 97 to the chamber 46a via the circuit 96. With the duty cycle of the solenoid 34 appropriately controlled, this control pressure is adjusted such that the forward clutch control valve 46 is controlled in the following manner.

That is, 100% is set as the duty cycle of the solenoid 34 to cause the control pressure supplied to the chamber 46a to be zero unless manual operation for starting the vehicle is performed even under the D range condition. (The manual operation for starting the vehicle involves depression of an accelerator pedal with a foot brake released when the vehicle speed is zero.) This causes the forward clutch control valve 46 to assume the position as illustrated by the right half thereof as viewed in FIG. 1A where the D range pressure supplied to the circuit 106 is blocked and thus prevented from reaching the forward clutch F/C, leaving the forward clutch F/C deactivated. Under this condition, since the high clutch H/C, band brake B/B, reverse clutch R/C, low and reverse brake LR/B, and overrun clutch OR/C are deactivated, too, as previously described, the automatic transmission stays in neutral unless the manual operation for starting the vehicle is performed even when the D range is selected in the automatic transmission. As a result, the occurrences of creep and select shock (i.e., a N-D select shock) are prevented.

Upon performing the manual operation for starting the vehicle, the computer starts decreasing the duty cycle of the solenoid 34 at a gradual rate until it finally become zero. This causes the gradual increase in the control pressure supplied to the chamber 46a until finally it increases to the same level as the pilot pressure. This gradual increase in the control pressure causes the spool 46b of the forward clutch control valve 46 to switch its position from the position as illustrated by the right half thereof to the position as illustrated by the left half thereof at the corresponding gradual rate, causing a gradual increase in hydraulic pressure supplied to the forward clutch F/C through the circuit 105 until the hydraulic pressure therein becomes as high as the D range pressure (i.e., line pressure) from the circuit 106. Thus, the forward clutch F/C is gradually activated until the automatic transmission establishes the first speed ratio in cooperation with the activations of the forward one-way clutch FO/C and low one-way clutch LO/C as shown in the Table 1, allowing the vehicle to move from a standstill. During this vehicle's starting operation, since the working hydraulic pressure of the forward clutch F/C gradually rises, the activation of the forward clutch F/C progresses at a predetermined speed in cooperation with the throttle effect due to the one-way orifice, thus preventing start-up shock.

(Second Speed Ratio)

When the vehicle has reached the running state where the second speed ratio is to be established as a result of an increase in the vehicle speed, the computer switches the state of the first shift solenoid 42 to the OFF state in accordance with the pattern shown in TABLE 3, causing the spool 38b of the first shift valve 38 to switch to the position as illustrated by the left half thereof as viewed in FIG. 1B. As a result, the first shift valve 38 now allows the circuit 126 to communicate with the drain port 38e, keeping on draining the circuit 126, and now allows the port 38h to communicate with the port 38i to keep on draining the circuit 116 via the ports 38h, 38i, and the port 52c of the 4-2 sequence valve 52 (This valve assumes the position as illustrated by the right half thereof as viewed in FIG. 1B under the condition where the third speed ratio servo release chamber 3S/R is not supplied with hydraulic pressure.) at the drain port 52d. On the other hand, the first shift valve 38 allows the circuit 113 to communicate with the circuit 106, supplying the second speed ratio servo apply chamber 2S/A with the D range pressure via the circuit 113, activating the band brake B/B. With the forward clutch F/C kept activated and the forward one-way clutch being activated, the activation of the band brake B/B causes the automatic transmission to shift to the second speed ratio as readily be understood from TABLE 1.

During this upshift operation from the first to second speed ratio, the hydraulic fluid pressure supplied to the second speed ratio servo apply chamber 2S/A is increased at a gradual rate owing to the fluid flow restriction due to the one-way orifice 114 and gradual upward movement, as viewed in FIG. 1B, of the accumulator piston 64a in response to the pressure build-up in the accumulator chamber 64e, thus alleviating shocks inherent with this shifting operation. Besides, the effect of this shift shock alleviation is secured because the backup pressure within the chamber 64d acting upon the accumulator piston 64a is proportional to the engine output torque.

Since, as readily understood from TABLE 1, the D range pressure is supplied to the second speed ratio servo apply chamber 2S/A not only upon selecting the second speed ratio, but also selecting the third speed ratio and the fourth speed ratio, the shuttle valve 32 keeps on staying in the position as illustrated by the upper half thereof as viewed in FIG. 1A because the D range pressure is supplied via the circuit 115 to the chamber 32c. This allows the supply of the pilot pressure from the circuit 79 to the chamber 46a of the forward clutch control valve 46, keeping the forward clutch control valve 46 in the position as illustrated by the left half thereof as viewed in FIG. 1A. Since the forward clutch control valve 46 does not effect pressure regulation when it assumes this position, the forward clutch F/C is kept in the fully activated state upon selecting any one of the second speed to fourth speed ratios. On the other hand, the chamber 30d of the lock-up control valve 30 is supplied with the control pressure from the circuit 97 so that the state of the torque converter 3 can be switched among the converter state, slip control state, and lock-up state in accordance with a predetermined pattern matched to the operating conditions by controlling the duty cycle of the duty solenoid 34 under the control of the computer.

(Third Speed Ratio)

When, subsequently, the vehicle has attained the running state where the third speed ratio is to be established, the computer switches the state of the second shift solenoid 44 to the OFF state, too, in accordance with the pattern shown in TABLE 3, causing the spool 40b of the second shift valve 40 to switch to the position as illustrated by the left half thereof as viewed in FIG. 1B. As a result, the D range pressure admitted to the port 40g is now supplied via the port 40f and circuit 118 to the high clutch H/C for activation thereof, In the process, the hydraulic fluid passes through the one-way orifice 120 unrestricted and then through the one-way orifice 119 restricted. On the other hand, this hydraulic fluid pressure passes through the branch circuit 121 off the circuit 118 and through the one-way orifice 122 unrestricted to the third speed ratio servo release chamber 3S/R, deactivating the band brake B/B. The hydraulic fluid pressure supplied to the third speed ratio servo release chamber 3S/R is applied to the chamber 52e of the 4-2 sequence valve 52 via the circuit 124, urging the spool 52b for upward movement toward the position as illustrated by the left half thereof. Even though this upward movement causes the port 52c to communicate with the port 52f after separating it from the drain port 52d, since the second shift valve 40 connects this port 52c to the drain port 40i, the circuit 116 continues to be drained. Thus, deactivation of the band brake B/B with the high clutch H/C and the forward one-way clutch FO/C held activated causes the automatic transmission to shift to the third speed ratio.

During this upshift operation from the second speed ratio to the third speed ratio, the hydraulic fluid pressure supplied to the high clutch H/C and the third speed ratio servo release chamber 3S/R gradually increases owing to the fluid flow restriction due to the one-way orifice 122 and gradual upward movement, as viewed in FIG. 1B, of the accumulator piston 66a against the line pressure within the chamber 66c, thus preventing the occurrence of shocks inherent with this shifting operation.

(Fourth Speed Ratio)

When, subsequently, the vehicle has reached the running state where the fourth speed ratio is to be established, the computer switches the state of the first shift solenoid 42 to the ON state in accordance with the pattern shown in TABLE 3, causing the spool 38b of the first shift valve 38 to switch to the position as illustrated by the position as illustrated by the right half thereof as viewed in FIG. 1B. This causes the first shift valve 38 to switch the port connection such that even though it disconnects the circuit 113 leading to the second speed ratio servo apply chamber 2S/A from the D range pressure circuit 106, it allows the circuit 113 to communicate via the port 38k with the circuit 118 in order to continue the supply of the D range pressure to the second speed ratio servo apply chamber 2S/A, whereas even though it disconnects the circit 126 from the drain port 38e, it allows the circuit 126 to communicate via the port 38j with the circuit 125 that communicates with the drain port 40e in order to cause the circuit 126 to continue to be drained. In this position, the first shift valve 38 allows the circuit 116 to communicate with the circuit 118 via the ports 38h and 38l, supplying the D range pressure via the circuit 118, circuit 116, ports 58h and 58d, circuit 135 and one-way orifice 136 to the fourth speed ratio servo apply chamber 4S/A, thus switching the state of the forward clutch F/C to the activated state. Thus, activating the band brake B/B with the forward clutch F/C and high clutch H/C held activated causes the automatic transmission to shift to the fourth speed ratio.

During this upshift operation from the third to fourth speed ratio, the fourth speed ratio select hydraulic fluid pressure (i.e., the highest speed ratio select pressure) supplied to the fourth speed ratio servo apply chamber 4S/A increases at a gradual rate owing to the fluid flow restriction due to the one-way orifice 136 and gradual upward movement, as viewed in FIG. 1C, of the accumulator piston 68a in response to the pressure build-up in the accumulator chamber 68c, thus alleviating shocks inherent with this shifting operation. Besides, the effect of this shift shock alleviation is secured because the backup pressure within the chamber 68c acting upon the accumulator piston 68a is proportional to the engine output torque.

Besides, this pressure (i.e., the fourth speed ratio select pressure) supplied to the fourth speed ratio servo apply chamber 4S/A passes to the chamber 66d of the accumulator 66. This results in switching the capacity of the accumulator 66 to a value meeting the demand for the upshift from the second speed ratio to the fourth speed ratio, this value being different from the capacity required for the upshift from the second speed ratio to the third speed ratio. As a result, shift shock alleviation takes place effectively even during the upshift from the second speed ratio to the fourth speed ratio jumping the third speed ratio.

(4–3 Downshift)

When, during running with the fourth speed ratio, the vehicle has reached the running state where the third speed ratio is to be established, the computer switches the state of the first shift solenoid 42 to the OFF state in accordance with the pattern shown in TABLE 3, causing the first shift valve 38 to switch to the position as illustrated by the left half thereof as viewed in FIG. 3B to have it assume the same position as it assumes upon selecting the third speed ratio. As a result, the hydraulic pressure supplied to the fourth speed ratio servo apply chamber 4S/R is depressurized quickly because the hydraulic fluid passes through the one-way orifice 136 unrestricted to be discharged at the drain port 40*i*, causing the downshift to the third speed raio to take place.

(4–2 Downshift)

When, during running with the fourth speed ratio, the vehicle has reached the running state where the second speed ratio is to be established, the computer switches the state of the first shift solenoid 42 to the OFF state, thereby to switch the first shift valve 38 to the position as illustrated by the left half thereof as viewed in FIG. 1B, and it switches the state of the second shift solenoid 44 to the ON state, thereby to switch the second shift valve 40 to the position as illustrated by the right half thereof as viewed in FIG. 1B. Even though this movement of the first shift valve 38 switches the connection of the circuit 113 leading to the second speed ratio servo apply chamber 2S/A to the circuit 106 from the circuit 118, the first shift valve 38 continues to supply hydraulic pressure to the second speed ratio servo apply chamber 2S/A. The switching of the second shift valve 40 results in disconnecting the circuit 118 from the D range pressure circuit 106 and connecting it to the drain port 40*e*. As a result, the activating pressure supplied to the high clutch H/C is eliminated by discharging the hydraulic fluid via the circuit 118 at the drain port 40*e* after having passed through the one-way orifice 119 unrestricted and being subject to flow restriction by the one-way rifice 120, and the pressure within the third speed ratio servo release chamber 3S/R is eliminated by discharging the hydraulic fluid via the circuit 121 and then through the same path at the drain port 40*e* after having being subject to flow restriction by the one-way orifice 122. The pressure within the third speed ratio servo release chamber 3S/R is delivered via the circuit 124 to the 4–2 sequence valve 52. This 4–2 sequence valve 52 is responsive to this pressure and assumes the position as illustrated by the left half thereof as viewed in FIG. 1B where the port 52*c* that is connected to the circuit 116 via the ports 38*i* and 38*h* is disconnected from the drain port 52*d* and allowed to communicate with the port 52*f* until this pressure is substantially eliminated. This prevents the pressure within the fourth speed ratio servo apply chamber 4S/A connected to the circuit 116 from being drained and thus it is maintained until the third speed ratio servo release chamber 3S/R is drained. During this transition, the pressure within the fourth speed ratio servo apply chamber 4S/R is supplied via the circuit 116 to the 4–2 relay valve 50, holding this valve to the position as illustrated by the right half thereof as viewed in FIG. 1B. This allows the circuit 113 leading to the second speed ratio servo apply chamber 2S/A to communicate with the fourth speed ratio servo apply chamber 4S/A via the ports 50*f*, 50*c*, circuit 117, ports 40*k*, 40*h*, 52*f*, 52*c*, 38*i*, 38*h*, circuit 116, ports 58*h*, 58*d*, and circuit 135, thus keeping the pressure within the fourth speed ratio servo apply chamber 4S/R.

When the pressure within the third speed ratio servo release chamber 3S/R is drained, the 4–2 sequence valve 52 shifts to the position as illustrated by the right half thereof as viewed in FIG. 1B where the pressure within the fourth speed ratio servo apply chamber 4S/A connected to the circuit 116 is drained at the drain port 52*d*. The draining of the pressure within the circuit 116 causes the 4–2 relay valve 50 to shift to the position as illustrated by the left half thereof as viewed in FIG. 1B, allowing the pressure within the circuit 117 to be drained at the drain port 50*d*. Thus, during this 4–2 downshift operation, the pressure within the fourth speed ratio servo apply chamber 4S/A is drained after the pressure within the high clutch H/C has been drained so that the 4–2 downshift skipping the third speed ratio is assured by preventing the former pressure from being drained prior to the drainage of the latter pressure which would cause the 4–3–2 downshift.

(3–2 Downshift)

When, during running with the third speed ratio, the vehicle has reached the running state where the second speed ratio is to be established, the computer switches the state of the second solenoid 44 to the ON state to cause the second shift valve 40 to shift to the position as illustrated by the right half thereof as viewed in FIG. 1B in accordance with the pattern shown in TABLE 3. Even though this switches the connection of the port 40*h* from the drain port 40*i* to 40*k*, the fourth speed ratio servo apply chamber 4S/A is kept in the depressurized state regardless of the position of the 4–2 sequence valve 52 because, during running with the third speed ratio, the circuit 116 connected to the fourth speed ratio servo apply chamber 4S/A is depressurized to cause the 4–2 relay valve 50 to assume the position as illustrated by the left half thereof where the circuit 117 is connected to the drain port 50*d* and thus the port 52*f* connected to the circuit 117 is caused to serve as a drain port.

The above mentioned shift of the second shift valve 40 causes the circuit 118 to communicate with the drain port 40*e*, draining the pressure within the high clutch H/C and the pressure within the three speed ratio servo release chamber 3S/R in the same manner as described in connection with the 4–2 downshift. This results in a downshift from the third speed ratio to the second speed ratio. As will be described hereinafter, the timing at which the pressure within the third speed ratio servo release chamber 3S/R varies depending on the operating conditions of the engine such that smooth 3–2 downshift takes place.

That is, when the engine output torque is below a predetermined value, the D range pressure (i.e., line pressure) applied to the port 56*c* of the shuttle valve 56 is low corresponding in magnitude to the engine output torque, allowing the shuttle valve 56 to assume the position as illustrated by the left half thereof as viewed in FIG. 1C, allowing the chamber 48*e* of the 3-2 timing valve 48 to communicate via the circuit 133 and port 56*e* with the drain port 56*f*, thus allowing the 3-2 timing valve 48 to assume the position as illustrated by the left half thereof as viewed in FIG. 1C. Thus, when the engine output torque is low, the third speed ratio servo release chamber 3S/R is depressurized quickly because the hydraulic fluid is discharged not only through the one-way orifice 122, but also through the orifice 48f. When the engine output torque is above the predetermined level, the D range pressure (i.e., line pressure) applied to the port 56c of the shuttle valve 56 is high corresponding to the increased engine output torque, urging the shuttle valve 56 to the position as illustrated by the right half thereof as viewed in FIG. 1C, connected the circuit 133 to the circuit 109, thus rendering the 3-2 timing valve 48 shiftable in accordance with the control pressure produced within the circuit 109. The computer switches the state of the third shift solenoid 60 to the ON state when the engine output torque is above the predetermined level and the vehicle speed is higher than a predetermined speed, causing the control pressure to increase to a value as high as the pilot pressure. This causes the 3-2 timing valve 48 to shift to the position as illustrated by the right half thereof as viewed in FIG. 1C, depressurizing the third speed servo release chamber 3S/R slowly by discharging the hydraulic fluid through the one-way orifice 122 only.

(2-1 Downshift)

When, during running with the second speed ratio, the vehicle reaches the running state where the first speed ratio is to be established, the computer switches the state of the shift solenoid 42 to the ON state, thus switching the first shift valve 38 to the position as illustrated by the right half thereof as viewed in FIG. 1B in accordance with the pattern shown in TABLE 3. This causes the circuit 113 leading to the second speed ratio servo apply chamber 2S/A to disconnected from the D range pressure circuit 106, but to be connected to the circuit 118 via the ports 38f and 38k. Since the circuit 118 is connected to the drain port 40e by the second shift valve 40, the pressure within the second speed ratio servo apply chamber 2S/A is depressurized quickly by discharging the hydraulic fluid passing through the one-way orifice 114, thus effecting a quick downshift from the second speed ratio to the first speed ratio.

(Overdrive Inhibition)

When the driver turns ON an OD inhibitor switch, not illustrated, disposed within the reach of the driver, wishing the engine brake to be effected with the third speed ratio and wishing no upshift to the fourth speed ratio (overdrive), the output of the OD switch causes the computer to set the ON/OFF state of the first and second shift solenoids 42 and 44 in accordance with the pattern shown in TABLE 3 so as to provide a speed ratio suitable for the driving state such that the fourth speed ratio will not be established. In this case, the automatic transmission is allowed to perform automatic shift between the first, second and third speed ratios in the similar manner as in the D range.

With the third speed ratio to be selected, the computer switches the state of the third shift solenoid 60 to the OFF state, bringing down the control pressure within the circuit to zero. When, under this condition, the engine torque is low (this is the case where the engine brake is needed) and accordingly the D range pressure (i.e., line pressure) applied to the port 56c of the shuttle valve 56 is low, thus failing to urge the shuttle valve 56 to the position as illustrated by the right half thereof as viewed in FIG. 1C, leaving it in the position as illustrated by the left half thereof as viewed in FIG. 1C, the control pressure within the circit 109 brought down to zero is admitted to the overrun clutch control valve 58 via the circuit 134. However, this admission of the control pressure to the chamber 58v does not cause the overrun clutch control valve 58 to shift from the position as illustrated by the left half thereof as viewed in FIG. 1C. Since the overrun clutch control valve 58 remains in the position as illustrated by the left half thereof, the D range pressure within the circuit 112 is now supplied via the circit 137 and the overrun clutch pressure reduction valve 62 to the overrun clutch OR/C, thus activating the same. This activation of the overrun clutch OR/C causes the transmission to effect the engine brake running with the third speed ratio as will be understood from the TABLE 1. During this engine brake running, since there is no hydraulic pressure at the port 36 II of the manual selector valve 36, the overrun clutch pressure reduction valve 62 effects pressure regulation to reduce the activating pressure supplied to the overrun clutch OR/C, matching the capacity thereof to a value required, thus causing substantial reduction in shocks upon shifting to engine brake operation. When the engine output torque is high or large (this is the case where engine brake is not required) and thus the D range pressure applied to the port 56c of the shuttle valve 56 is high enough to urge the shuttle valve 56 to assume the position as illustrated by the right half thereof, allowing the pilot pressure within the circuit 79 to be admitted via the circuit 134 to the overrun clutch control valve 58 to urge the same to the position as illustrated by the right half thereof as viewed in FIG. 1C. This position of the overrun clutch control valve 58 causes the circuit 138 to be drained always, thus rendering the overrun clutch OR/C deactivated, causing no engine brake to be effected. The hydraulic fluid to be discharged from the overrun clutch OR/C in this case is quickly discharged at the drain port 58e via the check valve 139.

II Range

When the driver places the spool 36a of the manual selector valve 36 at the II range, wishing the engine brake running with the second speed ratio, the manual valve allows the line pressure within the circuit 78 to output from the port 36 II, too, in accordance with the pattern shown in TABLE 2. Under this condition, the pattern of distribution of the pressure from the port 36 D is quite the same as it is upon selecting the D range. The computer switches the states of the first and second shift solenoids 42 and 44 in accordance with the pattern shown in TABLE 3 for selecting the first speed ratio or the second speed ratio, thus causing the automatic transmission to shift between the first speed ratio and the second speed ratio.

The pressure (II range pressure) from the port 36 II of the manual selector valve 36 reaches the port 62c of the overrun clutch pressure reduction valve 62 via the circuit 140. The II range pressure from the circuit 140 reaches also to the chamber 56g of the shuttle valve 56, locking this valve to the position as illustrated by the left half thereof as viewed in FIG. 1C. With the shuttle valve 56 locked to this position, the control pressure within the circuit 109 is supplied via the circuit 134 to the chamber 58c of the overrun clutch control valve 58. In this state, the computer brings down the control pressure to zero during running with the second speed ratio by switching the state of the third shift solenoid 60 to the OFF state, causing the overrun clutch control valve 58 to assume the position as illustrated by the left half thereof as viewed in FIG. 1C. This causes the D range pressure within the circuit 112 to be supplied to the overrun clutch OR/C via the overrun clutch pressure reduction valve 62 and the circuit 137, thus causing the automatic transmission to effect engine brake with the second speed ratio.

Under this condition, the overrun clutch pressure reduction valve 62 does not effect pressure reduction since it is locked as mentioned above, allowing the capacity of the overrun clutch OR/C to increase to a value matched to the requirement, thus preventing engine brake from becoming ineffective owing to the shortage in capacity.

During running with the first speed ratio selected, the computer turns ON the third shift solenoid 60, allowing an increase in the control pressure to the level as high as the pilot pressure, causing the overrun clutch control valve 58 to stay in the position as illustrated by the right half thereof as viewed in FIG. 1C. This results in discharge of the hydraulic fluid from the overrun clutch OR/C via the check valve 139 and port 58f at the drain port 58e, deactivating the overrun clutch OR/C, thus establishing the same state as is the case for running with the first speed ratio during the D range.

I Range

When the driver places the spool 36a of the manual selector valve 36 wishing the engine brake running with the first speed ratio, the line pressure within the circuit 78 is allowed to output from the ports 36 D, 36 II and 36 I in accordance with the pattern shown in TABLE 2. The pattern of distribution of the pressure from the port 36 D is quite the same as it is upon selecting the D range. The computer switches the states of the first and second shift solenoids 42 and 44 in accordance with the pattern shown in TABLE 3 for selecting the first speed ratio or the second speed ratio, thus causing the automatic transmission to shift between the first speed ratio and the second speed ratio. There are cases where the second speed ratio is established despite the fact the I range is selected because it is necessary to prevent the occurrence of the overrun of the engine which would be caused if the first speed ratio were established immediately after selecting the I range. In this situation, the second speed ratio is established and maintained until the vehicle speed drops sufficiently so that the downshift to the first speed ratio does not cause any excessive rotation of the engine.

The pressure from the port 36 II of the manual selector valve 36 is supplied to the shuttle valve 56 and the overrun clutch pressure reduction valve 62 in the same manner as the case upon selecting the II range, thereby to hold these valves to the position as illustrated by the left halves thereof, respectively. This allows the control pressure within the circuit 109 to switch the state of the overrun clutch control valve 58. With the I range selected, the computer turns OFF the third shift solenoid 60 to bring down the control pressure to zero, allowing the overrun clutch control valve 58 to assume the position as illustrated by the left half thereof as viewed in FIG. 1C, thus allowing the D range pressure within the circuit 112 to keep on activating the overrun clutch OR/C.

The pressure from the port 36 I of the manual selector valve 36 arrives via the circuit 132 at the I range pressure reduction valve 54 where it is reduced to the certain value in the manner descrived before and output to the circuit 131. The pressure within the circuit 131 is allowed to appear in the circuit 125 because the second shift valve 40 is held in the position as illustrated by the right half thereof regardless of which the first speed ratio or the second speed ratio is established. The first shift valve 38, on the other hand, stays in the position as illustrated by the left half thereof as viewed in FIG. 1B during running with the second speed ratio in accordance with the pattern shown in TABLE 3 where it cuts off the pressure within the circuit 125 and drains the pressure within the circuit 126 at the drain port 38e. As a result, the circuit 130 leading to the low and reverse brake LR/B is allowed to communicate via the shuttle ball 125 and the circuit 126 with the drain port 38e, causing deactivation of the low and reverse brake LR/B. This allows the engine brake running with the second speed ratio owing to the activation of the overrun clutch OR/C.

The first speed ratio is established after selecting the I range upon the vehicle speed dropping low enough not to cause excessive rotation of the engine. With this first speed ratio, the first shift valve 38 is in the position as illustrated by the right half thereof as viewed in FIG. 1B where the circuit 125 is allowed to communicate with the circuit 126, thus supplying the pressure within the circuit 125 via the circuit 126, shuttle ball 127 and circuit 130 to the low and reverse brake LR/B to activate the same. This results in establishment of engine brake running with the first speed ratio because the overrun clutch OR/C is activated.

During engine brake running with the first or second speed ratio, the overrun clutch pressure reduction valve 62 is locked to the position as illustrated by the left half thereof as viewed in FIG. 1C, causing no pressure reduction to take place. This causes the capacity of the overrun clutch OR/C to be maintained sufficiently high enough to the value demanded, thus preventing the engine brake from becoming ineffective due to the slip therein. Since during engine brake running with the first speed ratio the pressure admitted to the low and reverse brake LR/B is reduced to the certain value by means of the I range pressure reduction valve 54, the capacity of the low and reverse brake is adjusted to the value demanded, thus allowing the downshift to the first speed ratio to take place without substantial shocks.

R Range

When the driver places the spool 36a of the manual selector valve 36 at the R range wishing the reverse travel, the line pressure within the circuit 78 is allowed to output from the port 36 D only in accordance with the pattern shown in TABLE 2. The pressure from the port 36 R (reverse select pressure) is supplied via the circuit 128 and the one-way orifice 129 where it is subject to fluid flow restriction to the reverse clutch R/C to activate the same and at the same time it is supplied to the chamber 68d of the accumulator 68. The pressure within the circuit 128 is supplied via the circuit 130 to the low and reverse brake LR/B to activate the same pushing through the shuttle ball 127. As a result, the automatic transmission selects the reverse drive as shown in TABLE 1.

During this transition, the pressure supplied to the reverse clutch R/C increases at a gradual rate to cause the engagement of the reverse clutch R/C to progress at a predetermined gradual rate because the hydraulic fluid to be supplied to the reverse clutch R/C is restricted by the one-way orifice 129 and then pushes down the stepped piston 68a of the accumulator upon selecting the R range (this stepped piston being shifted to the position as illustrated by the left half thereof as viewed in FIG. 1C upon placing the spool 36a of the manual selector valve 36 at the R range), thus alleviating shocks (a N-R select shock) taking place upon selecting the R range from the N range.

Referring to FIG. 1C, the accumulator 68 is designed to alleviate select shock occurring when the R range is selected in the transmission. Thus, the setting of the spring 68b is such that the downward movement of the piston 68a against the spring 68b begins immediately after the reverse drive select pressure has been applied to the chamber 68d with the other two chambers 68c and 68e depressurized. In other words, the spring force of the spring 68b is low enough to allow such downward movement of the piston.

Let us now consider why the shift shock is effectively alleviated when the transmission shifts from the third speed ratio to the fourth speed ratio despite the fact that the piston 68a of the accumulator will not start moving upwards from the position as illustrated by the right half thereof as viewed in FIG. 1C until the pressure within the chamber 68e builds up and becomes high enough to cause the piston 68a to expand the chamber 68e. As will be understood from the engine specific torque versus throttle opening degree characteristic curve (beta) shown in FIG. 6, the engine specific torque starts rising after the throttle opening degree has become greater than a sufficiently great value. Thus, even if the piston 68a of the accumulator 68 will not start moving upwards from the position as illustrated by the right half thereof as viewed in FIG. 1C during the pressure build-up within the chamber 68e of the accumulator 68 with low throttle opening degrees, the shift shock which will occur when the engine specific torque rises during operating condition with relatively great throttle opening degrees can be effectively alleviated. This explains why the shift shock when the transmission shifts from the third speed ratio to the fourth speed ratio can be effectively alleviated despite the fact the spring force of the spring 68b is set as equal to a value sufficiently small enough to effectively alleviate the N-D select shock.

Figure 4:
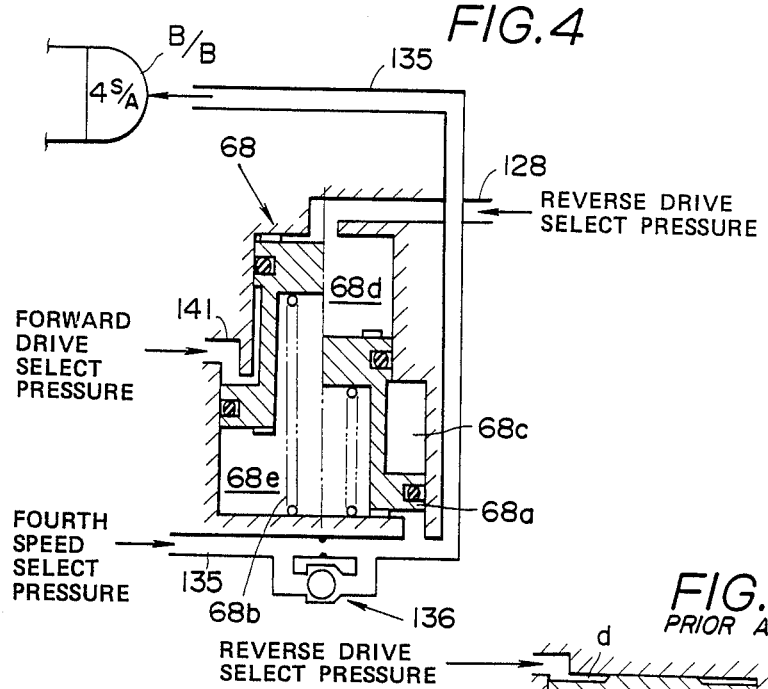
FIG. 4 is a fragmentary sectional view showing second embodiment according to the present invention.
Figure 5:
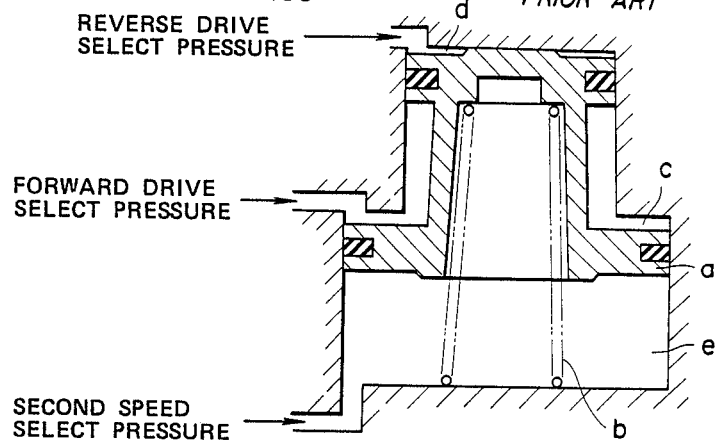
FIG. 5 is a sectional view of a known accumulator discussed before.
Figure 6:
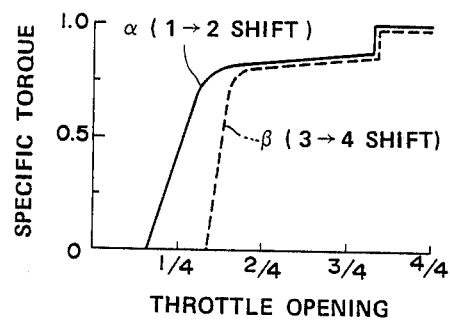
FIG. 6 shows specific torque versus throttle opening degree characteristic curves of an engine operatively coupled with the automatic transmission shown in FIG. 1.

The second embodiment is described hereinafter along with FIG. 4.

In the first embodiment, the line pressure is supplied as a back-up pressure to the chamber 68c from the line pressure circuit 78 through the circuit 111 via the accumulator control valve 70 and this back-up pressure is not used to activate the forward clutch F/C that is to be kept engaged for forward drive with every speed ratio (see TABLE 1). The forward clutch control valve 46 as shown in FIG. 1A is provided for alleviating the N-D select shock. In the second embodiment shown in FIG. 4, a back-up pressure chamber 68c of an accumulator 68 is connected to a circuit 105 at a portion between the one-way orifice 107 and the forward clutch F/C, see FIG. 1C, through a circuit 141 so as to permit the forward drive select pressure to be supplied to the back-up pressure chamber 68c. Since the spring force of a spring 68b is set similarly to the first embodiment, a piston 68a of the accumulator 68 moves downwards from the position as illustrated by the left half thereof immediately after the pressure build-up in the back-up pressure chamber 68c. This assures effective alleviation of the N-D select shock.

What is claimed is:

1. An apparatus comprising:
    an automatic transmission which is shiftable to a plurality of speed ratios including a predetermined speed ratio other than a first speed ratio and a second speed ratio, the predetermined speed ratio haing a reduction ratio smaller than a reduction ratio of the first or second speed ratio, the automatic transmission being shiftable from neutral to a reverse drive ratio, and a control system comprising:
    an accumulator including a piston defining three chambers which are selectively expandable in volume in response to movement of said piston, and resilient means acting on said piston in assisting movement of said piston in one of two directions and yieldably resisting movement of said piston in the other direction which is opposite to said one direction, said three chambers being comprised of a first chamber, a second chamber and a third chamber;
    means for supplying a forward drive select hydraulic fluid pressure to said first chamber to act on said piston to urge said piston against said resilient means in such a manner as to decrease the volume of said second chamber when a forward drive range is selected in the automatic transmission and discharging hydraulic fluid from said first chamber when a reverse drive range is selected;
    a first friction element adapted to be engaged when the transmission upshifts to the predetermined speed ratio when said forward drive range is selected;
    means for initiating an upshift to the predetermined speed ratio by supplying a predetermined speed select hydraulic fluid pressure to said first friction element;
    said second chamber of said accumulator communicating with said first friction element to allow said predetermined speed select hydraulic fluid pressure to act on said piston in such a manner as to assist the action of said resilient means to cause said piston to move in said one direction so as to expand the volume of said second chamber, allowing gradual build-up of said predetermined speed select hydraulic fluid pressure supplied to said first friction element;
    a second friction element adapted to be engaged when said reverse drive range is selected; and
    means for initiating a shift from the neutral to the reverse drive ratio by supplying a reverse drive range select hydraulic fluid pressure to said second friction element when said reverse drive range is selected in the automatic transmission;
    said third chamber of said accumulator communicating with said second friction element to allow said reverse drive range select hydraulic fluid pressure to act on said piston against the action of said resilient means in said second direction so as to expand the volume of said third chamber, allowing gradual build-up of said reverse drive range select hydraulic fluid pressure supplied to said second friction element.

2. A control system as claimed in claim 1, wherein said first chamber is a back-up pressure chamber.

3. An apparatus as claimed in claim 2, wherein said predetermined speed ratio is a fourth speed ratio and said first friction element is a band brake that is to be applied in effecting an upshift to the second speed ratio and said fourth speed ratio.

4. An apparatus as claimed in claim 3, wherein said second friction element is a rear clutch to be engaged upon selecting said reverse drive range.

5. An apparatus as claimed in claim 4, including a third friction element which is to be engaged upon selecting said forward drive range, and said third friction element communicates with said first chamber.

6. An apparatus as claimed in claim 5, wherein said third friction element is a forward clutch.

7. An apparatus comprising:
an automatic transmission for an automotive vehicle having an engine with a throttle which opens in degrees, the automatic transmission being shiftable between a plurality of forward speed ratios including a predetermined speed ratio other than a first speed ratio and a second speed ratio, the automatic transmission being shiftable from neutral to a reverse drive ratio, the predetermined speed ratio having a reduction ratio smaller than a reduction ratio of the first or second speed ratio, and a control system comprising:
a pressure regulator valve means for generating a servo actuating hydraulic fluid pressure which is variable with the degree of throttle opening;
a first friction element adapted to be engaged when the transmission shifts to the second speed ratio and when the transmission shifts to the predetermined speed ratio when a forward drive range is selected;
shift means for initiating an upshift to the second speed ratio at a shift point where the degree of throttle opening is relatively small by supplying said servo actuating hydraulic fluid pressure to said first friction element as a second speed select pressure and for initiating an upshift to the predetermined speed ratio at another shift point where the degree of throttle opening is relatively large by supplying said servo actuating hydraulic fluid pressure to said first friction element as a predetermined speed select pressure;
an accumulator incuding a piston defining three chambers which are selectively expandable in volume in response to movement of said piston, and resilient means acting on said piston in assisting movement of said piston in one of two directions and yieldably resisting movement of said piston in the other direction which is opposite to said one direction, said three chambers being comprised of a first chamber, a second chamber and a third chamber;
means for supplying said servo actuating hydraulic fluid pressure to said first chamber of said accumulator to act on said piston to urge said piston against said resilient means in such a manner as to decrease the volume of said second chamber when said forward drive range is selected and for discharging hydraulic fluid from said first chamber when a reverse drive range is selected;
said second chamber of said accumulator communicating with said first friction element to allow said predetermined speed select pressure to act on said piston to assist the action of said resilient means to cause said piston to move in said one direction so as to expand the volume of said second chamber, allowing gradual build-up of said predetermined speed select pressure supplied to said first friction element;
a second friction element adapted to be engaged when the transmission shifts from the neutral to the reverse drive ratio upon selecting a reverse drive range;
means for initiating a shift from the neutral to the reverse drive ratio by supplying said servo actuating hydraulic fluid pressure to said second friction element upon selecting the reverse drive range as a reverse drive select pressure;
said third chamber of said accumulator communicating with said second friction element to allow said reverse drive select pressure to act on said piston to move said piston against the action of said resilient means in said second direction so as to expand the volume of said third chamber, allowing gradual build-up of said reverse drive select pressure supplied to said second friction element.

8. An apparatus comprising:
an automatic transmission for an automotive vehicle having an engine with a throttle which opens in degrees, the automatic transmission being shiftable between a plurality of forward speed ratios including a predetermined speed ratio other than a first speed ratio and a second speed ratio, the automatic transmission being shiftable from neutral to a reverse drive ratio, the predetermined speed ratio having a reduction ratio smaller than a reduction ratio of the first or second speed ratio, and a control system comprising:
a pressure regulator valve means for generating a servo actuating hydraulic fluid pressure which is variable with the degree of throttle opening;
a first friction element adapted to be engaged when the transmission shifts to the second speed ratio and when the transmission shifts to the predetermined speed ratio when a forward drive range is selected, said first friction element including a servo motor means having a servo release chamber, a first servo apply chamber and a second servo apply chamber, said servo motor means being operative to engage said first friction element when said first servo apply chamber is pressurized with said servo release chamber depressurized and said second servo apply chamber depressurized, said servo motor means being operative to release the engagement of said first friction element when said servo release chamber is pressurized with said second servo apply chamber depressurized, said servo motor means being operative to engage said first friction element when said second servo apply chamber is pressurized;
shift means for initiating an upshift to the second speed ratio at a shift point where the degree of throttle opening is relatively small by supplying said servo actuating hydraulic fluid pressure to said first servo apply chamber of said servo motor means of said first friction element as a second speed select pressure and for initiating an upshift to the predetermined speed ratio at another shift point where the degree of throttle opening is relatively large by supplying said servo actuating hydraulic fluid pressure to said second servo apply chamber of said servo motor means of said first friction element as a predetermined speed select pressure;
an accumulator including a piston defining three chambers which are selectively expandable in volume in response to movement of said piston, and resilient means acting on said piston in assisting movement of said piston in one of two directions and yieldably resisting movement of said piston in the other direction which is opposite to said one direction, said three chambers being comprised of a first chamber, a second chamber and a third chamber;

means for supplying said servo actuating hydraulic fluid pressure to said first chamber of said accumulator to act on said piston to urge said piston against said resilient means in such a manner as to decrease the volume of said second chamber when said forward drive range is selected and for discharging hydraulic fluid from said first chamber when a reverse drive range is selected;

said second chamber of said accumulator communicating with said second servo apply chamber of said servo motor means of said first friction element to allow said predetermined speed select pressure to act on said piston to assist the action of said resilient means to cause said piston to move in said one direction so as to expand the volume of said second chamber, allowing gradual build-up of said predetermined speed select pressure supplied to said first friction element;

a second friction element adapted to be engaged when the transmission shifts from the neutral to the reverse drive ratio upon selecting a reverse drive range; and;

means for initiating a shift from the neutral to the reverse drive ratio by supplying said servo actuating hydraulic fluid pressure to said second friction element upon selecting the reverse drive range as a reverse drive select pressure;

said third chamber of said accumulator communicating with said second friction element to allow said reverse drive select pressure to act on said piston to move said piston against the action of said resilient means in said second direction so as to expand the volume of said third chamber, allowing gradual build-up of said reverse drive select pressure supplied to said second friction element.

* * * * *